United States Patent
Teraoka et al.

(10) Patent No.: US 10,770,757 B2
(45) Date of Patent: Sep. 8, 2020

(54) MANUFACTURING METHOD OF ELECTRODE ASSEMBLY

(71) Applicant: SEIKO EPSON CORPORATION, Tokyo (JP)

(72) Inventors: Tsutomu Teraoka, Matsumoto (JP); Tomofumi Yokoyama, Matsumoto (JP); Hitoshi Yamamoto, Chino (JP); Tomoyuki Okuyama, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 191 days.

(21) Appl. No.: 15/764,260

(22) PCT Filed: Sep. 26, 2016

(86) PCT No.: PCT/JP2016/078205
§ 371 (c)(1),
(2) Date: Mar. 28, 2018

(87) PCT Pub. No.: WO2017/068914
PCT Pub. Date: Apr. 27, 2017

(65) Prior Publication Data
US 2018/0269532 A1 Sep. 20, 2018

(30) Foreign Application Priority Data
Oct. 23, 2015 (JP) .................. 2015-208664
Oct. 29, 2015 (JP) .................. 2015-212628

(51) Int. Cl.
*H01M 10/0585* (2010.01)
*H01M 4/08* (2006.01)
(Continued)

(52) U.S. Cl.
CPC ......... *H01M 10/0585* (2013.01); *H01M 2/04* (2013.01); *H01M 4/06* (2013.01);
(Continued)

(58) Field of Classification Search
CPC ............... H01M 2/04; H01M 10/0585; H01M 10/0562; H01M 6/18; H01M 2004/027;
(Continued)

(56) References Cited

U.S. PATENT DOCUMENTS

2014/0162113 A1* 6/2014 Ohta .................. H01B 1/08
429/162
2014/0216631 A1 8/2014 Teraoka et al.
(Continued)

FOREIGN PATENT DOCUMENTS

JP   H05-054712 A   3/1993
JP   2006-260887 A  9/2006
(Continued)

OTHER PUBLICATIONS

Nov. 8, 2016 International Search Report issued in International Patent Application No. PCT/JP2016/078205.

*Primary Examiner* — Gregg Cantelmo
(74) *Attorney, Agent, or Firm* — Oliff PLC

(57) ABSTRACT

A manufacturing method of an electrode assembly capable of easily manufacturing a configuration in which an electrolyte and an active material are bonded to each other is provided.
A step of supplying, solidifying, and crystallizing a solid electrolyte 22 including $Li_{2+x}C_{1-x}B_xO_3$ (X represents a real number equal to or greater than 0 and smaller than 1), so as to be in contact with an active material aggregate 12 including a communication hole 14 between active material particles 13, is included. In a case where the solid electrolyte 22 is melted, the solid electrolyte 22 is heated in a range of 650 degrees to 900 degrees.

4 Claims, 17 Drawing Sheets

(51) Int. Cl.
  *H01M 4/139* (2010.01)
  *H01M 10/0562* (2010.01)
  *H01M 6/18* (2006.01)
  *H01M 4/06* (2006.01)
  *H01M 4/62* (2006.01)
  *H01M 4/13* (2010.01)
  *H01M 2/04* (2006.01)
  *H01M 4/02* (2006.01)

(52) U.S. Cl.
  CPC ............... *H01M 4/08* (2013.01); *H01M 4/13* (2013.01); *H01M 4/139* (2013.01); *H01M 4/62* (2013.01); *H01M 4/621* (2013.01); *H01M 6/18* (2013.01); *H01M 10/0562* (2013.01); *H01M 2004/027* (2013.01); *H01M 2004/028* (2013.01)

(58) Field of Classification Search
  CPC .... H01M 2004/028; H01M 4/06; H01M 4/08; H01M 4/13; H01M 4/139; H01M 4/62; H01M 4/621
  See application file for complete search history.

(56) References Cited

U.S. PATENT DOCUMENTS

2014/0220436 A1    8/2014  Yokoyama et al.
2016/0329539 A1*  11/2016  Kawaji ................. H01M 4/13

FOREIGN PATENT DOCUMENTS

| JP | 2014-154236 A | 8/2014 | |
| JP | 2014-154237 A | 8/2014 | |
| WO | WO-2015128982 A1 * | 9/2015 | ........ H01M 10/0562 |

* cited by examiner

MANUFACTURING METHOD OF ELECTRODE ASSEMBLY

TECHNICAL FIELD

The present invention relates to a manufacturing method of an electrode assembly.

BACKGROUND ART

Lithium batteries are used in power sources of a large number of electric devices such as portable information devices, as primary batteries and secondary batteries. In the lithium battery, a cathode, an electrolyte layer, and an anode are laminated in this order, and the electrolyte layer mediates conduction of lithium ions. In recent years, research is made regarding all-solid type lithium batteries using a solid electrolyte replaced with a liquid electrolyte, as lithium batteries satisfying both high energy density and stability. The all-solid type lithium batteries are disclosed in PTL 1.

According to PTL 1, a porous solid electrolyte included in a lithium battery is formed by using a sol-gel method. An aluminum compound, as well as compounds of lithium, lanthanum, and titanium oxide are used in the solid electrolyte. In addition, a battery active material is provided in holes of the solid electrolyte by using a sol-gel method. A lithium salt and a manganese salt or a cobalt salt is used in the battery active material.

In the lithium battery, the battery active material is provided in holes of the porous solid electrolyte to bring the solid electrolyte and the battery active material into contact with each other. Then, lithium ions move between the solid electrolyte and the battery active material.

CITATION LIST

Patent Literature

PTL 1: JP-A-2006-260887

SUMMARY OF INVENTION

Technical Problem

PTL 1 discloses that a battery active material is provided in holes of a porous solid electrolyte by using a sol-gel method. That is, the hole is filled with an active material solution obtained by dissolving a material of the battery active material in a solvent, and then, heating and drying were performed to remove the solvent. In the hole, the solvent is removed, and thus, a film of the battery active material is formed on a surface of the solid electrolyte, but the film cannot be formed over the whole hole, and a cavity portion may be generated. Since lithium ions cannot move to the cavity portion, it is necessary to decrease the size of the cavity portion as small as possible, in order to increase capacity of the battery.

Solution to Problem

The present invention has been made to solve at least one of the aforementioned problems and can be realized as the following embodiments or application examples.

Application Example 1

According to the application example, there is provided a manufacturing method of an electrode assembly, the method including: a first step of forming an active material aggregate including a communication hole; a second step of providing a solid material including $Li_{2+x}C_{1-x}B_xO_3$ (X represents a real number exceeding 0 and equal to or smaller than 1) on the active material aggregate; a third step of melting the solid material; and a fourth step of solidifying and crystallizing a molten material of the solid material, in which the communication hole is filled with the molten material in the third step.

According to the application example, first, the active material aggregate including the communication hole is formed in the first step. The solid material including $Li_{2+x}C_{1-x}B_xO_3$ is provided on the active material aggregate in the second step. The solid material is a material for forming a solid electrolyte. X is a substitution rate of boron B and represents a real number exceeding 0 and equal to or smaller than 1. Accordingly, the solid material for forming the solid electrolyte essentially includes boron B, and, in a case where X is 1, the solid material includes $Li_3BO_3$. Then, the solid material for forming the solid electrolyte is melted in the third step. The communication hole is filled with the molten material. Then, the molten material is slowly cooled, solidified, and crystallized. Therefore, the electrode assembly including the crystallized solid electrolyte can be formed in the communication hole of the active material aggregate.

The solid material including $Li_{2+x}C_{1-x}B_xO_3$ may be heated and melted. Accordingly, the amount of materials to be vaporized in a case of filling the molten material filled in the communication hole is small, thereby reducing a volume change at the time of the solidification. Thus, a percentage of the solid electrolyte occupying the inside of communication hole can be increased and a porosity of the inside of the communication hole can be decreased. Therefore, the solid electrolyte can be provided in the communication hole of the active material aggregate with excellent productivity, and the electrode assembly capable of configuring a battery having comparatively large capacity can be formed.

Application Example 2

In the manufacturing method of the electrode assembly according to the application example, it is preferable that the solid material is heated at a temperature of 650° C. to 900° C. in the third step.

According to the application example, it is preferable that the solid material for forming the solid electrolyte is heated in a range of 650 degrees to 900 degrees. In a case where the heating temperature is set to be equal to or higher than 650 degrees, the solid material for forming the solid electrolyte can be melted. In a case where the heating temperature is set to be equal to or higher than 900 degrees, a composition of the solid electrolyte changes, and thus, performance of the electrolyte is deteriorated. Therefore, by heating the solid material of the solid electrolyte in the range described above, the solid material of the solid electrolyte can be melted, without deteriorating performance of the electrolyte.

Application Example 3

In the manufacturing method of the electrode assembly according to the application example, it is preferable that X in the $Li_{2+x}C_{1-x}B_xO_3$ is 0.2 to 0.6.

According to the application example, it is preferable that the range of X in the $Li_{2+x}C_{1-x}B_xO_3$ is a real number of 0.2 to 0.6. At this time, a preferable Li conductivity of the solid electrolyte can be obtained.

Application Example 4

In the manufacturing method of the electrode assembly according to the application example, it is preferable that the amount of the solid material is an amount with which a layer can be formed on the active material aggregate after the solidification and crystallization.

According to the application example, it is preferable that the amount of the solid material for forming the solid electrolyte is an amount with which a layer can be formed on the active material aggregate after the solidification and crystallization. Accordingly, the layer obtained by solidifying and crystallizing the solid material can be formed on the active material aggregate. Thus, in the electrode assembly, it is possible to form a surface from which the active material aggregate is not exposed and only the crystallized solid electrolyte is exposed. By forming a surface from which only the solid electrolyte is exposed, one electrode is formed on the surface from which only the solid electrolyte is exposed, in a case of configuring a battery, it is possible to inhibit short circuit from occurring due to a contact of the active material aggregate with both of a cathode side and an anode side.

Application Example 5

According to the application example, there is provided an electrode assembly including: an active material aggregate including a communication hole; and a crystallized solid electrolyte including at least $Li_{2+x}C_{1-x}B_xO_3$ (X represents a real number exceeding 0 and equal to or smaller than 1) formed in the communication hole.

According to the application example, the electrode assembly includes the active material aggregate including the communication hole. The crystallized solid electrolyte is provided in this communication hole and the solid electrolyte includes $Li_{2+x}C_{1-x}B_xO_3$. X is a substitution rate of boron B and represents a real number exceeding 0 and equal to or smaller than 1. Accordingly, boron B is essentially included in the solid electrolyte.

Application Example 6

In the electrode assembly according to the application example, it is preferable that the electrode assembly further includes a first layer including the active material aggregate, and a second layer not including the active material aggregate, in which the solid electrolyte of the first layer and the solid electrolyte of the second layer are connected to each other.

According to the application example, the electrode assembly includes the first layer and the second layer. The first layer includes an active material aggregate and a solid electrolyte. The second layer does not include an active material aggregate and includes a solid electrolyte. The solid electrolyte of the first layer and the solid electrolyte of the second layer are connected to each other. The first layer including the active material aggregate and the solid electrolyte can be obtained by providing a solid material which is a material of a solid electrolyte on an active material aggregate, and melting and crystallizing the solid material. By setting the amount of the solid material which is a material of the solid electrolyte at this time as an amount exceeding the amount of the solid material filled in the active material aggregate, the second layer of the solid electrolyte is formed on the first layer. The solid electrolyte of the first layer and the solid electrolyte of the second layer formed as described above include a connected crystal structure, and an electrode assembly having a preferable conductivity of Li ions can be obtained.

Application Example 7

According to the application example, there is provided a battery including: the electrode assembly described above; a first electrode provided on the first layer side; and a second electrode provided on the second layer side.

According to the application example, the electrode assembly is interposed between the first electrode and the second electrode. Accordingly, it is possible to configure a battery which can be charged and discharged by allowing Li ions to move in the solid electrolyte of the first layer and the solid electrolyte of the second layer. In addition, by providing the second layer not including the active material aggregate between the first electrode and the second electrode in the battery, it is possible to prevent short circuit in the battery.

Application Example 8

According to the application example, there is provided a manufacturing method of an electrode assembly, the method including: a first step of forming an active material formed body including a communication hole; a second step of providing a solid material including $Li_{2+x}C_{1-x}B_xO_3$ (X represents a real number exceeding 0 and equal to or smaller than 1) on the active material formed body; a third step of melting the solid material; and a fourth step of rapidly cooling and solidifying a molten material of the solid material, in which the communication hole is filled with the molten material in the third step.

According to the application example, first, an active material formed body including a communication hole is formed in the first step. A solid material including $Li_{2+x}C_{1-x}B_xO_3$ is provided on the active material formed body in the second step. The solid material is a material for forming a solid electrolyte. X is a substitution rate of boron B and represents a real number exceeding 0 and equal to or smaller than 1. Accordingly, the solid material for forming the solid electrolyte essentially includes boron B, and, in a case where X is 1, the solid material includes $Li_3BO_3$. Then, the solid material for forming the solid electrolyte is melted in the third step. The communication hole is filled with the molten material. Then, the molten material of the solid material is rapidly cooled, solidified, and non-crystallized. Therefore, the electrode assembly including the amorphous solid electrolyte can be formed in the communication hole of the active material formed body.

The solid material including $Li_{2+x}C_{1-x}B_xO_3$ may be heated and melted. Accordingly, the amount of materials to be vaporized in a case of solidifying the molten material filled in the communication hole is small, thereby reducing a volume change at the time of the solidification. Thus, a percentage of the solid electrolyte occupying the inside of communication hole can be increased and a porosity of the inside of the communication hole can be decreased. Therefore, the solid electrolyte can be provided in the communication hole of the active material formed body with excellent productivity, and the electrode assembly capable of configuring a battery having comparatively large capacity can be formed.

Application Example 9

In the manufacturing method of the electrode assembly according to the application example, it is preferable that a cooling speed for rapidly cooling the molten material of the solid material is $10^2$ degree/sec to $10^3$ degree/sec in the fourth step.

According to the application example, the cooling speed for rapidly cooling the molten material of the solid material is equal to or higher than $10^2$ degree/sec. At this cooling speed, the solid electrolyte can be non-crystallized, in a case where the molten material of the solid material is solidified. In addition, the cooling speed is equal to or lower than $10^3$ degree/sec. At this time, a device of cooling the molten material of the solid material can be easily prepared.

Application Example 10

In the manufacturing method of the electrode assembly according to the application example, it is preferable that the solid material is heated at a temperature of 650° C. to 900° C. in the third step.

According to the application example, it is preferable that the solid material for forming the solid electrolyte is heated in a range of 650 degrees to 900 degrees. In a case where the heating temperature is set to be equal to or higher than 650 degrees, the solid material for forming the solid electrolyte can be melted. In a case where the heating temperature is set to be equal to or higher than 900 degrees, a composition of the solid electrolyte changes, and thus, performance of the electrolyte is deteriorated. Therefore, by heating the solid material of the solid electrolyte in the range described above, the solid material of the solid electrolyte can be melted, without deteriorating performance of the electrolyte.

Application Example 11

In the manufacturing method of the electrode assembly according to the application example, it is preferable that X in the $Li_{2+X}C_{1-X}B_XO_3$ is 0.2 to 0.6.

According to the application example, it is preferable that the range of X in the $Li_{2+X}C_{1-X}B_XO_3$ is a real number of 0.2 to 0.6. At this time, a preferable Li conductivity of the solid electrolyte can be obtained.

Application Example 12

In the manufacturing method of the electrode assembly according to the application example, it is preferable that the amount of the solid material is an amount with which a layer can be formed on the active material formed body after the solidification.

According to the application example, it is preferable that the amount of the solid material for forming the solid electrolyte is an amount with which a layer can be formed on the active material formed body after the solidification and non-crystallization. Accordingly, the layer obtained by solidifying and non-crystallizing the solid material can be formed on the active material formed body. Thus, in the electrode assembly, it is possible to form a surface from which the active material formed body is not exposed and only the amorphous solid electrolyte is exposed. By forming a surface from which only the solid electrolyte is exposed, one electrode is formed on the surface from which only the solid electrolyte is exposed, in a case of configuring a battery, and thus, it is possible to inhibit short circuit from occurring due to a contact of the active material formed body with both of a cathode side and an anode side.

Application Example 13

According to the application example, there is provided an electrode assembly including: an active material formed body including a communication hole; and an amorphous solid electrolyte including at least $Li_{2+X}C_{1-X}B_XO_3$ (X represents a real number exceeding 0 and equal to or smaller than 1) formed in the communication hole.

According to the application example, the electrode assembly includes the active material formed body including the communication hole. The amorphous solid electrolyte is provided in this communication hole and the solid electrolyte includes $Li_{2+X}C_{1-X}B_XO_3$. X is a substitution rate of boron B and represents a real number exceeding 0 and equal to or smaller than 1. Accordingly, boron B is essentially included in the solid electrolyte.

Application Example 14

In the electrode assembly according to the application example, it is preferable that the electrode assembly further includes a first layer including the active material formed body, and a second layer not including the active material formed body, in which the solid electrolyte of the first layer and the solid electrolyte of the second layer are connected to each other.

According to the application example, the electrode assembly includes the first layer and the second layer. The first layer includes an active material formed body and a solid electrolyte. The second layer does not include an active material formed body and includes a solid electrolyte. The solid electrolyte of the first layer and the solid electrolyte of the second layer are connected to each other. The first layer including the active material formed body and the solid electrolyte can be obtained by providing a solid material which is a material of a solid electrolyte on an active material formed body, and melting and non-crystallizing the solid material. By setting the amount of the solid material which is a material of the solid electrolyte at this time as an amount exceeding the amount of the solid material filled in the active material formed body, the second layer of the solid electrolyte is formed on the first layer. The solid electrolyte of the first layer and the solid electrolyte of the second layer formed as described above include a connected amorhpous structure, and an electrode assembly having a preferable conductivity of lithium ions can be obtained.

Application Example 15

In the battery including the electrode assembly according to the application example, it is preferable that the battery includes a first electrode provided on the first layer side; and a second electrode provided on the second layer side.

According to the application example, the electrode assembly is interposed between the first electrode and the second electrode. Accordingly, it is possible to configure a battery which can be charged and discharged by allowing lithium ions to move in the solid electrolyte of the first layer and the solid electrolyte of the second layer. In addition, by providing the second layer not including the active material formed body between the first electrode and the second electrode in the battery, it is possible to prevent short circuit in the battery.

DESCRIPTION OF EMBODIMENTS

Hereinafter, embodiments will be described with reference to the drawings. Each member of each drawing shows with different scales for each member, in order to show each member with a size capable of being recognized on each drawing.

First Embodiment

Figure 1:
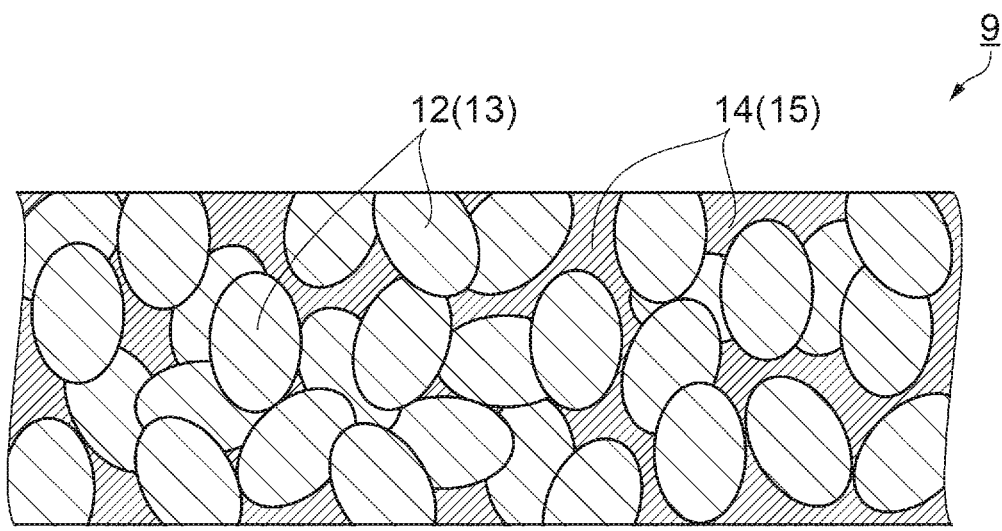
FIG. 1 is a schematic sectional side view of main parts showing a structure of an electrode assembly according to a first embodiment.

In the embodiment, a specific example of a lithium battery including an electrode assembly and a manufacturing method of a lithium battery of manufacturing this lithium battery will be described with reference to the drawings. In the manufacturing method of a lithium battery, an electrode assembly is included. The electrode assembly according to the embodiment will be described with reference to FIG. 1. FIG. 1 is a schematic sectional side view of main parts showing a structure of the electrode assembly. As shown in FIG. 1, an electrode assembly 9 includes an active material aggregates 12. The active material aggregates 12 are a porous formed body in which a plurality of active material particles 13 which are formation materials are connected to each other. A communication hole 14 is positioned between the active material particles 13. The communication hole 14 has a shape of a hole in which cavities between the active material particles 13 are connected to each other in a ramified manner.

A crystalline solid electrolyte 15 is provided in the communication hole 14. Since the communication hole 14 is provided in a ramified manner, wide areas of the active material aggregate 12 and the solid electrolyte 15 are in contact with each other. Accordingly, lithium ions easily move between the active material aggregate 12 and the solid electrolyte 15. In addition, the communication hole 14 between the active material aggregates 12 is filled with the solid electrolyte 15. Accordingly, the solid electrolyte 15 is a connected component in a ramified manner. Lithium ions move in the solid electrolyte 15. Since the communication hole 14 is filled with the solid electrolyte 15 in a ramified manner, paths where lithium ions can move are ensured in every corner of the active material aggregates 12. Thus, lithium ions easily move.

A lithium complex oxide can be used as the formation material of the active material particles 13. A component which is an oxide which essentially includes lithium and includes two or more kinds of metal ions, and in which oxo acid ions do not exist, is referred to as a lithium complex oxide. Examples of the lithium complex oxide include $LiCoO_2$, $LiNiO_2$, $LiMn_2O_4$, $Li_2Mn_2O_3$, $LiFePO_4$, $Li_2FeP_2O_7$, $LiMnPO_4$, $LiFeBO_3$, $Li_3V_2(PO_4)_3$, $Li_2CuO_2$, $LiFeF_3$, $Li_2FeSiO_4$, and $Li_2MnSiO_4$.

In addition, solid solutions in which some atoms in crystals of these lithium complex oxides are substituted with other transition metals, typical metals, alkali metals, alkaline rare earths, lanthanoid, chalcogenide, or halogen may also be included in the lithium complex oxide, and these solid solutions can also be used as a cathode active material. In the embodiment, $LiCoO_2$ is used as the active material particles 13, for example.

An average particle diameter of the active material particles 13 is preferably 300 nm to 5 μm, more preferably 450 nm to 3 μm, and even more preferably 500 nm to 1 μm. In a case of using the active material particles 13 having this average particle diameter, a percentage of the communication hole 14 included in the active material aggregate 12 can be set to be in a preferable range. Accordingly, a surface area of the active material aggregate 12 can be relatively increased, thereby increasing a contact area of the active material aggregate 12 and the solid electrolyte 15.

$Li_{2+x}C_{1-x}B_xO_3$ is used as a material of the solid electrolyte 15. X is a substitution rate of boron B and represents a real number exceeding 0 and equal to or smaller than 1. Accordingly, the solid material of the solid electrolyte does not include $Li_2CO_3$, in a case where X is 0, but includes $Li_3BO_3$, in a case where X is 1. The solid electrolyte 15 is a crystalline material.

Figure 2:
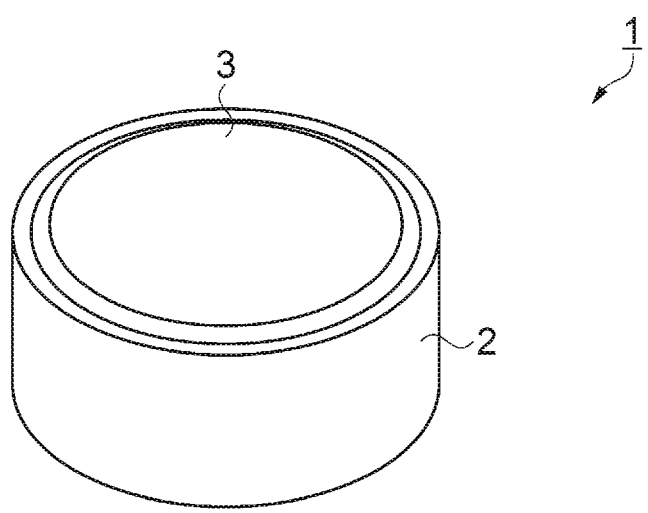
FIG. 2 is a schematic perspective view showing a structure of a lithium battery.

Next, the lithium battery will be described with reference to FIGS. 2 to 5. FIG. 2 is a schematic perspective view showing a structure of the lithium battery. As shown in FIG. 2, a lithium battery 1 as the battery includes a container portion 2 having a bottomed cylindrical shape, and a lid portion 3. One of the container portion 2 and the lid portion 3 is a cathode and the other one is an anode. The lithium battery 1 is an all-solid type secondary battery capable of power storing, but may be used as a primary battery. The electrode assembly 9 is used in the lithium battery 1.

Figure 3:
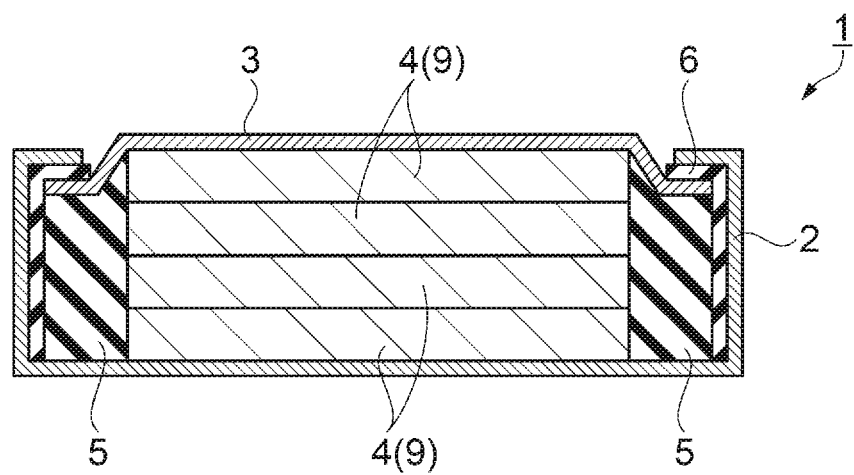
FIG. 3 is a schematic sectional view showing a structure of the lithium battery.

FIG. 3 is a schematic sectional view showing a structure of the lithium battery 1. As shown in FIG. 3, four battery units 4 as disc-shaped batteries are provided in the container portion 2 in an overlapped manner. The battery units 4 are overlapped in a columnar shape. The electrode assembly 9 is used in each battery unit 4. The number of battery units 4 provided in one lithium battery 1 is not particularly limited. The number thereof may be 1 to 3 or may be equal to or greater than 5. The battery units 4 are used with power of approximately 2.8 v to approximately 4.2 v. By combining parallel connection and series connection for the connection of the plurality of battery units 4, it is possible to adjust a voltage value necessary for the lithium battery 1.

First insulating portions 5 having a cylindrical shape are provided around the overlapped battery units 4. The lid portion 3 is provided on the upper side of the drawing of the battery units 4 and the first insulating portions 5, and second insulating portions 6 are provided on the outer peripheral side of the lid portion 3 and the side surface side of the first insulating portions 5. The second insulating portions 6 are positioned between the container portion 2 and the lid portion 3 and also positioned between the container portion 2 and the first insulating portions 5.

The first insulating portions 5 fix the battery units 4 so that the battery units 4 do not move in a horizontal direction of the drawing. In addition, the first insulating portions 5 performs insulation so that side surfaces of the battery units 4 are not electrically connected to the container portion 2. The second insulating portions 6 insulate the container portion 2 and the lid portion 3 from each other. The material of the container portion 2 and the lid portion 3 is not particularly limited, as long as it has conductivity and rigidity, and metals having corrosion resistance, or metals having surfaces subjected to surface treatment of corrosion resistance can be used. In the embodiment, stainless steel is, for example, used as the material of the container portion 2 and the lid portion 3. The material of the first insulating portions 5 and the second insulating portions 6 is not particularly limited, as long as it has insulating properties, and a resin material is preferably used for ease of processing.

In the embodiment, an aryl resin is used as the material of the first insulating portions 5 and the second insulating portions 6.

Figure 4:
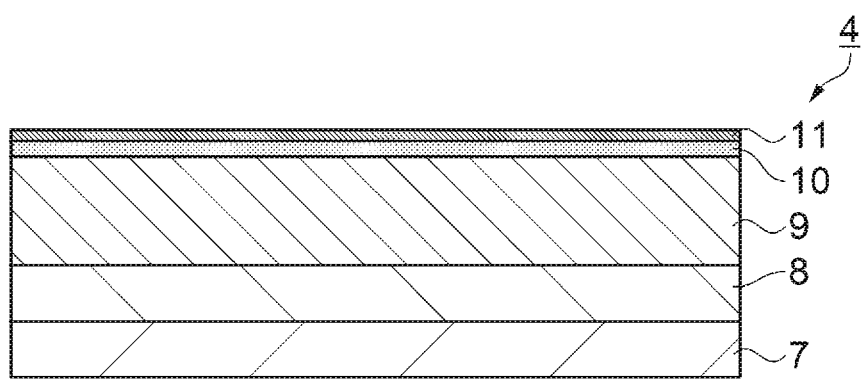
FIG. 4 is a schematic side view showing a structure of a battery unit.

FIG. 4 is a schematic side view showing a structure of the battery unit. As shown in FIG. 4, the battery unit 4 includes a lower electrode 7 as a first electrode. A carbon sheet 8, the electrode assembly 9 as a first layer, a separation layer 10 as a second layer, and an upper electrode 11 as a second electrode are overlapped on each other in this order and provided on the lower electrode 7. A thickness of each portion is not particularly limited, and in the embodiment, a thickness of the lower electrode 7 is approximately 100 μm, a thickness of the carbon sheet 8 is approximately 100 μm, a thickness of the electrode assembly 9 is approximately 300 μm, a thickness of the separation layer 10 is approximately 2 μm, and a thickness of the upper electrode 11 is approximately 2 μm, for example.

The lower electrode 7 is an electrode which is a cathode and functions as a substrate which maintains a structure. As the material of the lower electrode 7, one kind of metal selected from the group consisting of copper, magnesium, titanium, iron, cobalt, nickel, zinc, aluminum, germanium, indium, gold, platinum, silver, and palladium, or an alloy including two or more kinds of metals selected from this group can be used. In the embodiment, copper is used as the material of the lower electrode 7, for example. The carbon sheet 8 is a carbon film which allows a current to efficiently flow between the lower electrode 7 and the electrode assembly 9.

The separation layer 10 is a film which prevents short circuit of the electrode assembly 9 and the upper electrode 11 and is a film configured with lithium triborate (LBO), lithium carbon borate (LCBO), and the like. In the embodiment, LCBO was used in the separation layer 10, for example. In addition, the upper electrode 11 is an electrode which is an anode and a film of lithium was used.

In a case of charging the lithium battery 1, in the solid electrolyte 15, lithium ions move from the active material aggregate 12 of the electrode assembly 9 to the upper electrode 11. The upper electrode 11 is an anode of the lithium film. In addition, in a case of discharging, in the solid electrolyte 15, lithium ions move from the upper electrode 11 to the active material aggregate 12 of the electrode assembly 9.

Figure 5:
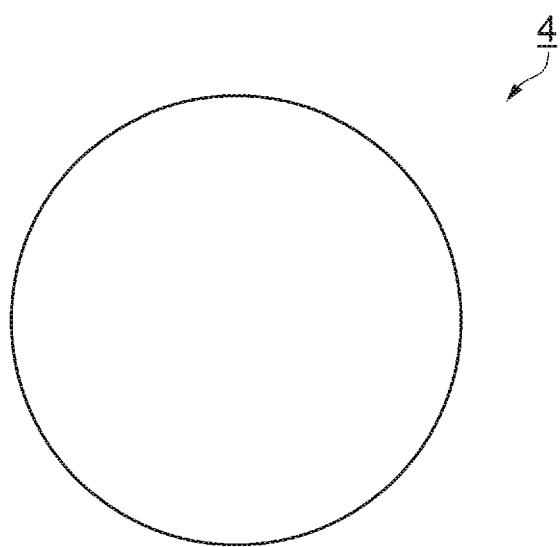
FIG. 5 is a schematic plan view showing a structure of the battery unit.

FIG. 5 is a schematic plan view showing a structure of the battery unit. As shown in FIG. 5, a planar shape of the battery unit 4 is a circle. In the embodiment, as a shape matched with this, the lower electrode 7, the carbon sheet 8, and the electrode assembly 9 also has a disc shape. A diameter of the battery unit 4 is not particularly limited, and in this embodiment, the diameter thereof is, for example, set as 10 mm to 20 mm.

Figure 6:
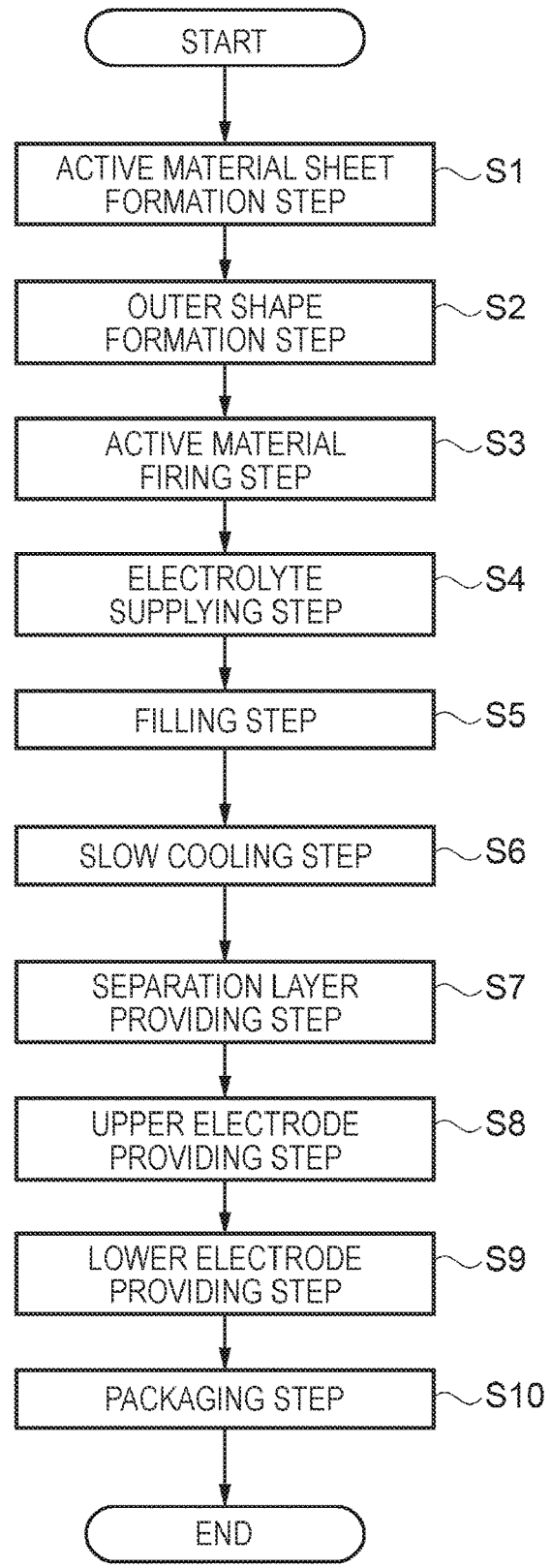
FIG. 6 is a flowchart of a manufacturing method of a lithium battery.

Next, a manufacturing method of the lithium battery 1 described above will be described with reference to FIGS. 6 to 17. FIG. 6 is a flowchart of the manufacturing method of the lithium battery, and FIGS. 7 to 16 are schematic views for explaining the manufacturing method of the lithium battery. In the flowchart of FIG. 6, a step S1 is an active material sheet formation step. This step is a step of mixing the active material particles 13 and a binder with each other to obtain a sheet shape. Then, the process proceeds to a step S2. The step S2 is an outer shape formation step. This step is a step of forming an outer shape of an intermediate product of the active material aggregate 12. The intermediate product is referred to as a product which is in the middle stage to the completion. Then, the process proceeds to a step S3. The step S3 is an active material firing step. This step is a step of removing the binder from the intermediate product of the active material aggregate 12 and sintering the active material particles 13. Then, the process proceeds to a step S4.

The step S4 is an electrolyte supplying step. This step is a step of supplying a material of the solid electrolyte 15 onto the active material aggregate 12. Then, the process proceeds to a step S5. The step S5 is a filling step. This step is a step of filling the communication hole 14 of the active material aggregate 12 by heating the material of the solid electrolyte 15. Then, the process proceeds to a step S6. The step S6 is a slow cooling step. This step is a step of slowly cooling the active material aggregate 12 filled with the material of the solid electrolyte 15. The electrode assembly 9 is completed in the step S6. The step S1 to the step S6 show the manufacturing method of the electrode assembly 9. Then, the process proceeds to a step S7.

The step S7 is a separation layer providing step. This step is a step of providing the separation layer 10 on one surface of the electrode assembly 9. Then, the process proceeds to a step S8. The step S8 is an upper electrode providing step. This step is a step of providing the upper electrode 11 to be overlapped on the separation layer 10. Then, the process proceeds to a step S9. The step S9 is a lower electrode providing step. This step is a step of providing the carbon sheet 8 and the lower electrode 7 on the other surface of the electrode assembly 9. The battery unit 4 is completed in the step S9. Then, the process proceeds to a step S10. The step S10 is a packaging step. This step is a step of providing the battery units 4, the first insulating portions 5, the second insulating portions 6, and the lid portion 3 in the container portion 2 and fixing the lid portion 3 with the container portion 2. The lithium battery 1 is completed by the steps described above. The step S1 to step S3 correspond to a first step, and the step S4 corresponds to a second step. The step S5 corresponds to a third step. The step S6 corresponds to a fourth step.

Next, the manufacturing method will be specifically described corresponding to the steps shown in FIG. 6, with reference to FIGS. 7 to 17.

Figure 7:
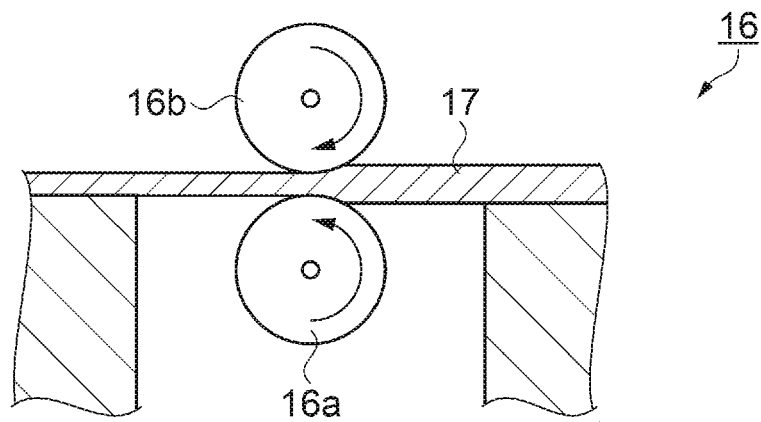
FIG. 7 is a schematic view for explaining the manufacturing method of a lithium battery.

FIG. 7 is a diagram corresponding to the active material sheet formation step of the step S1. In the step S1, a raw material powder of the active material particles 13 is mixed with a binder and the like and made into a paste state. The obtained material is spread and dried in a thin sheet shape on a plastic carrier film. The dried sheet is referred to as a green sheet.

The binder is not particularly limited, as long as it can bind the raw powder of the active material particles 13 to each other and be removed by heating. Examples of the binder include a cellulose-based binder, an acrylic-based binder, a polyvinyl alcohol-based binder, and a polyvinyl butyral-based binder, in addition to polycarbonate, and one or a combination of two or more kinds of these can be used.

In addition, a solvent may be used in the active material sheet formation step. The solvent used in the step is not particularly limited, and, for example, aprotic solvents such as butanol, ethanol, propanol, methyl isobutyl ketone, toluene, and xylene can be used. Accordingly, it is possible to reduce a deterioration of the active material particles 13 due to contact with the solvent. These solvents can be used alone or in combination of a plurality of solvents. In the embodiment, as the binder, a material obtained by adding dioxane to polycarbonate is used, for example.

In addition, an organic polymer compound such as polyvinylidene fluoride or polyvinyl alcohol may be added to the binder. A particulate hole forming material may be added to the binder, in order to adjust a size of the communication hole 14. An average particle diameter of the hole forming material is not particularly limited, and is, for example, set as 0.5 μm to 10 μm, in the embodiment. In addition, particles of which a formation material is a substance having deliquescency such as a polyacrylic acid may be added to the binder. Water generated around the particles due to the deliquescence of the particles connects particulate lithium complex oxides to each other. The binder functions as a binder which connects particulate lithium complex oxides to each other.

Next, as shown in FIG. 7, a green sheet 17 is provided in a roller 16. The roller 16 includes a first cylinder 16a and a second cylinder 16b. A central axis of the first cylinder 16a and a central axis of the second cylinder 16b are connected to a rotation axis of a rotation mechanism (not shown). The rotation mechanism is configured with a motor, a speed reducer, and a control device which controls a rotation speed. By the rotation mechanism, the first cylinder 16a rotates counterclockwise and the second cylinder 16b rotates clockwise. A distance between the outer periphery of the first cylinder 16a and the outer periphery of the second cylinder 16b is adjusted as a predetermined distance.

The green sheet 17 is interposed between the first cylinder 16a and the second cylinder 16b from the right side of the drawing. By rotating the first cylinder 16a and the second cylinder 16b, the green sheet 17 is rolled to have a predetermined thickness and discharged to the right side of the drawing. The surfaces of the first cylinder 16a and the second cylinder 16b are processed as mirror surfaces. The surfaces of the first cylinder 16a and the second cylinder 16b are transferred to the rolled green sheet 17, and thus, the surface of the green sheet 17 becomes a flat surface.

Figure 8:
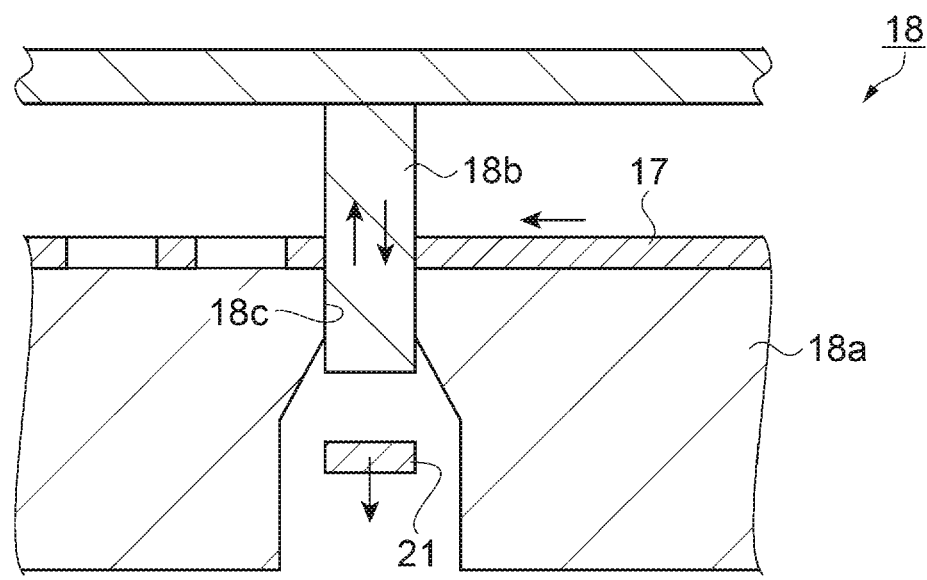
FIG. 8 is a schematic view for explaining the manufacturing method of a lithium battery.

FIG. 8 is a diagram corresponding to the outer shape formation step of the step S2. As shown in FIG. 8, in the step S2, the green sheet 17 is provided in a pressing machine 18. The pressing machine 18 includes a die plate 18a and a punch 18b. A circular hole 18c is provided in the die plate 18a and the punch 18b has a columnar shape. A diameter of the hole 18c and a diameter of the punch 18b become approximately the same dimensions.

An operator provides the green sheet 17 on the die plate 18a. The pressing machine 18 moves the punch 18b in a vertical direction of the drawing. At this time, the green sheet 17 is extruded to the punch 18b and passes through the hole 18c of the die plate 18a. An active material disc 21 which is the green sheet 17 formed in a disc shape is formed. The pressing machine 18 moves the green sheet 17 to the left side of the drawing, and continuously forms the active material disc 21 by vertically moving the punch 18b.

Figure 9:
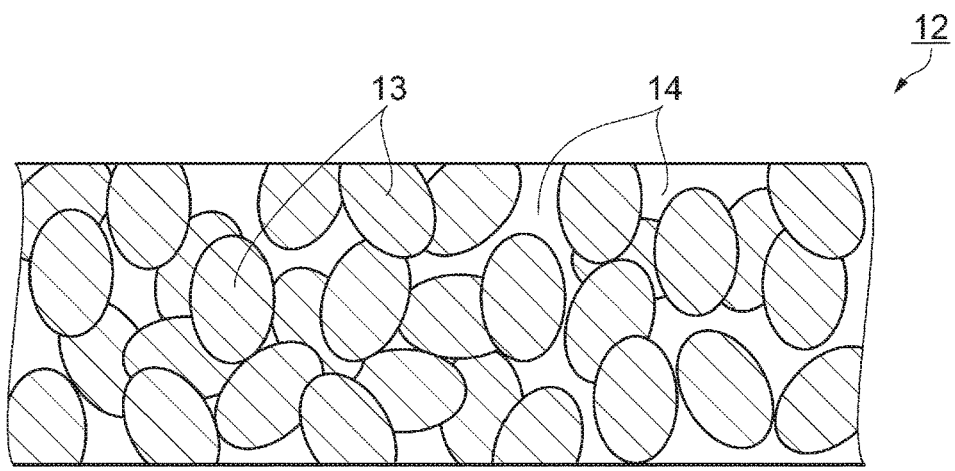
FIG. 9 is a schematic view for explaining the manufacturing method of a lithium battery.

FIG. 9 is a diagram corresponding to the active material firing step of the step S3. In the active material firing step of the step S3, first, a degreasing step of removing the binder from the active material disc 21 is performed. The active material disc 21 is provided in reducing gas and heated in a temperature atmosphere of approximately 150° C. to 500° C. for approximately 0.1 to 20 hours. Accordingly, the binder can be removed from the active material disc 21. Then, the heating is performed to a temperature at which the active material particles 13 are not melted. Since a melting point of $LiCoO_2$ is 1,100° C., the heating is performed to a temperature lower than 1,100° C. The heating temperature and the heating time are not particularly limited, and in the embodiment, the heating temperature is set as 900° C. to 950° C. and the heating time is set as approximately 4 to 14 hours, for example. As a result, as shown in FIG. 9, the active material particles 13 are bonded to each other and the active material aggregate 12 is completed. The communication hole 14 is provided between the active material particles 13. The communication hole 14 is cavities formed due to the removal of the binder, and the cavities are connected to each other to be the communication hole 14. The plurality of communication holes 14 are provided in the active material aggregate 12, and thus, the active material aggregate 12 is also referred to as a porous body or a porous substance.

Figure 10:
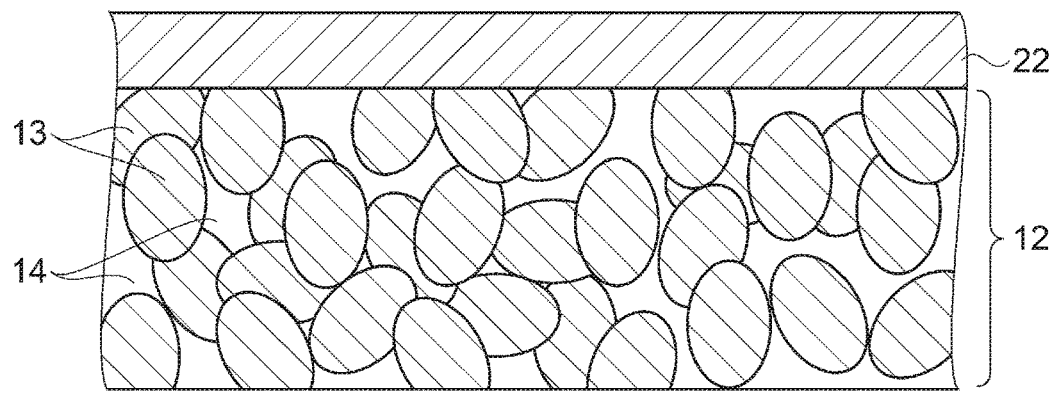
FIG. 10 is a schematic view for explaining the manufacturing method of a lithium battery.

FIG. 10 is a diagram corresponding to the electrolyte supplying step of the step S4. As shown in FIG. 10, in the step S4, a solid electrolyte 22 as a solid material which is a material of the solid electrolyte 15 is supplied onto the active material aggregate 12 so as to contact with the active material aggregate 12. The solid electrolyte 22 is a material of the solid electrolyte 15 and is a solid material of the solid electrolyte 15. The solid electrolyte 22 is not particularly limited and can be supplied in various aspects such as a powder, a sheet shape, or a block shape. In the embodiment, the solid electrolyte 22 is supplied in a state of powder, for example.

In a case where the X which is a substitution rate of boron B is a real number exceeding 0 and equal to or smaller than 1, the solid electrolyte 22 includes $Li_{2+x}C_{1-x}B_xO_3$. X may be a real number exceeding 0, and for example, in a case where X is 0.1, $Li_{2+x}C_{1-x}B_xO_3$ is $Li_{2.1}C_{0.9}B_{0.1}O_3$, and in a case where X is 1, $Li_{2+x}C_{1-x}B_xO_3$ is $Li_3BO_3$.

Figure 11:
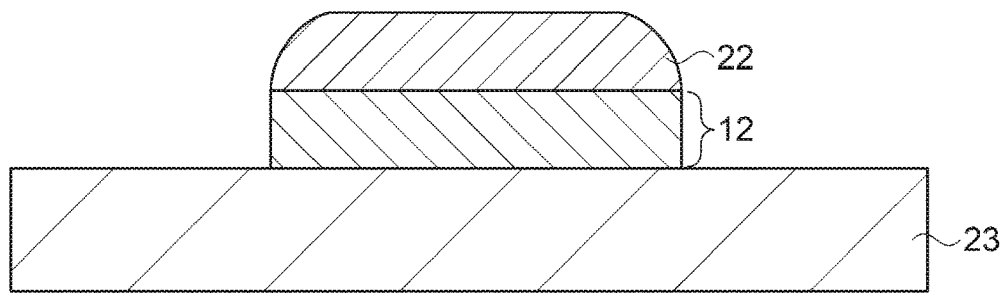
FIG. 11 is a schematic view for explaining the manufacturing method of a lithium battery.
Figure 12:
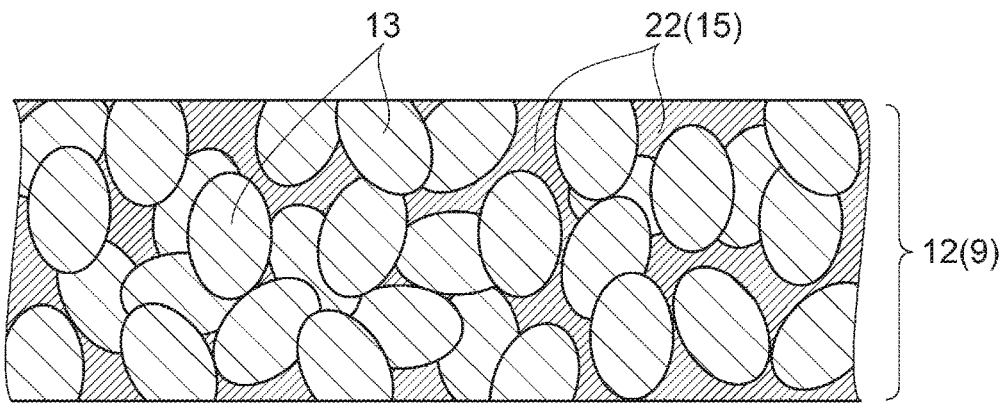
FIG. 12 is a schematic view for explaining the manufacturing method of a lithium battery.

FIGS. 11 and 12 are diagrams corresponding to the filling step of the step S5. As shown in FIG. 11, in the step S5, the active material aggregate 12 is loaded on a loading table 23. The loading table 23 has heat resistance and withstands a high temperature equal to or higher than 1,000 degrees. As the material of the loading table 23, ceramic such as alumina or silicon carbide can be used.

Then, the active material aggregate 12 and the solid electrolyte 22 are heated. The active material aggregate 12 provided with the solid electrolyte 22 is put into an electric furnace which is heated in advance. The solid electrolyte 22 is heated and melted in the electric furnace. The melted solid electrolyte 22 is referred to as a molten material. As shown in FIG. 12, since gravity works in the molten material, the communication holes 14 of the active material aggregate 12 are filled with the molten material. In addition, a capillary phenomenon occurs and the communication holes 14 are easily filled with the molten material. The loading table 23 may be set as a porous structure such as a porous ceramic. The molten material of the solid electrolyte 22 overflowed from the active material aggregate 12 may be adsorbed to the loading table 23.

In a case where the solid electrolyte 22 is filled, the solid electrolyte 22 is heated and melted to become liquid, without using a solvent. Since the amount of a material vaporized at the time of solidifying the molten material of the solid electrolyte 22 filled in the communication hole 14 is small, it is possible to reduce a volume change of the solid electrolyte 22. Therefore, it is possible to decrease a porosity of the communication hole 14 after solidifying the molten material of the solid electrolyte 22.

At the time of melting the solid electrolyte 22, the solid electrolyte 22 is heated in a range of 650 degrees to 900 degrees. By setting the heating temperature to be equal to or higher than 650 degrees, the solid material of the solid electrolyte 22 can be melted. In a case where the heating temperature is equal to or higher than 900 degrees, the composition of the solid electrolyte 22 changes, and thus, the performance of the electrolyte is deteriorated. Accordingly, by setting the heating temperature of the solid electrolyte 22 to be in a range of 650 degrees to 900 degrees, the solid electrolyte 22 can be melted without deteriorating the performance of the electrolyte.

In addition, the heating temperature at the time of melting the solid electrolyte 22 is preferably 700 degrees to 850 degrees. Further, it is preferable to change the heating temperature of the solid electrolyte 22 in accordance with the composition of the solid electrolyte 22. Since the melting temperature changes in accordance with the value of the boron substitution rate X of $Li_{2+x}C_{1-x}B_xO_3$, it is preferable to change the heating temperature, in a case of dissolving the solid electrolyte 22.

The heating time of the solid electrolyte 22 is not limited, because the heating time changes in accordance with the amount of the solid electrolyte 22. In a case where the heating time is long, the composition of the solid electrolyte 22 changes, and thus, the heating time is preferably short. The heating time in a case where the amount of the solid electrolyte 22 is 20 mg, is preferably 4 minutes to 6 minutes. In the embodiment, the heating time in a case where the amount of the solid electrolyte 22 is 20 mg was, for example, set as 5 minutes.

In the slow cooling step of the step S6, the active material aggregate 12 filled with the solid electrolyte 22 is slowly cooled. Accordingly, the molten material of the solid electrolyte 22 is solidified and crystallized. In a case where the atmosphere temperature of the slow cooling is high, a grain size of a crystal increases, and in a case where the atmosphere temperature is low, a grain size of a crystal decreases. The crystal grain size can be controlled by adjusting the atmosphere temperature. The molten material of the solid electrolyte 22 is solidified to become the solid electrolyte 15, and the electrode assembly 9 is completed. Both surfaces of the electrode assembly 9 may be set to be flat by polishing. A contact resistance with an electrode can be decreased.

Figure 13:
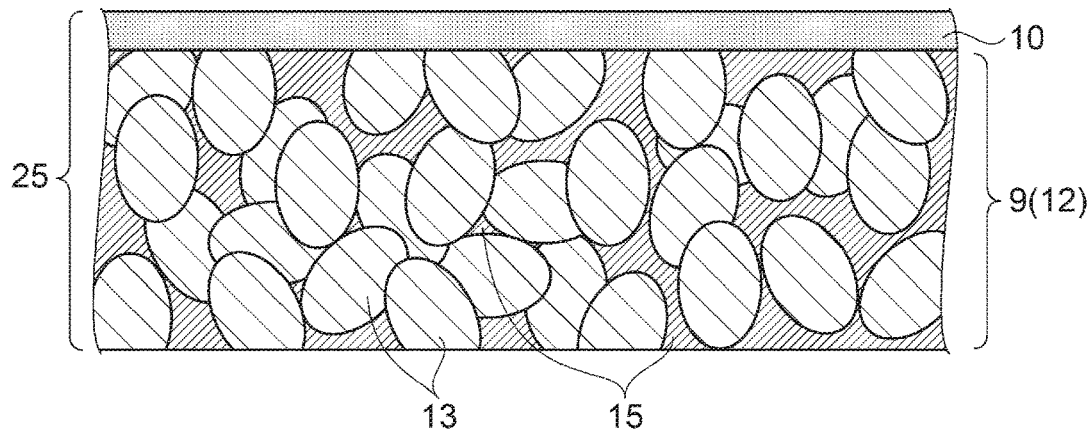
FIG. 13 is a schematic view for explaining the manufacturing method of a lithium battery.

FIG. 13 is a diagram corresponding to the separation layer providing step of the step S7. As shown in FIG. 13, in the step S7, the separation layer 10 is provided on the active material aggregate 12. The separation layer 10 is a film of LCBO. A film forming method of the separation layer 10 is not particularly limited, and a liquid phase film forming method such as a coating method or a spraying method can be used, in addition to a gas phase film forming method such as a sputtering method or a vacuum deposition method. In the embodiment, the separation layer 10 was completed by using a sputtering method, for example. An aspect in which the separation layer 10 is provided on the electrode assembly 9 is set as a separation layer-attached electrode assembly 25.

Figure 14:
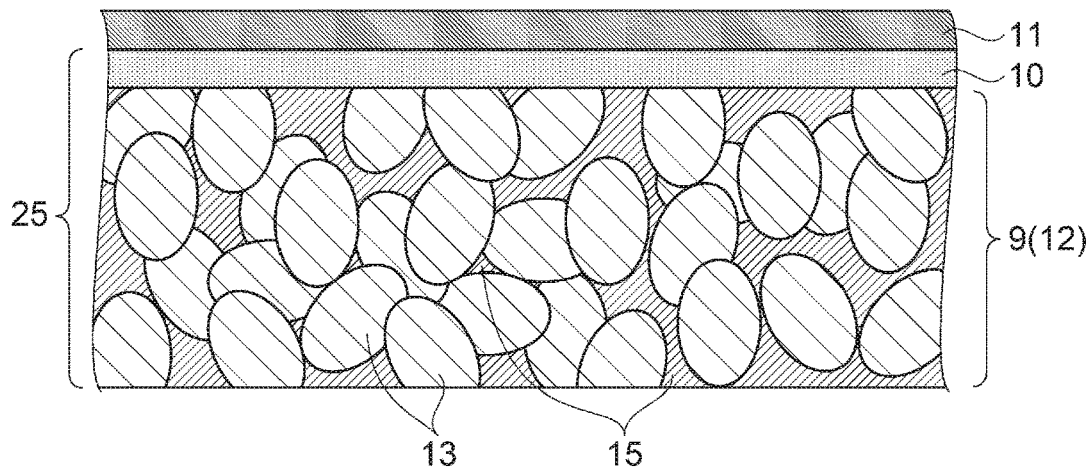
FIG. 14 is a schematic view for explaining the manufacturing method of a lithium battery.

FIG. 14 is a diagram corresponding to the upper electrode providing step of the step S8. As shown in FIG. 14, in the step S8, the upper electrode 11 is provided on the separation layer 10. The upper electrode 11 is a film of lithium. As a film forming method of the upper electrode 11, the same method used for the separation layer 10 can be used, and the film forming method is not particularly limited. In the embodiment, the upper electrode 11 was formed by using a vacuum deposition method, for example.

Figure 15:
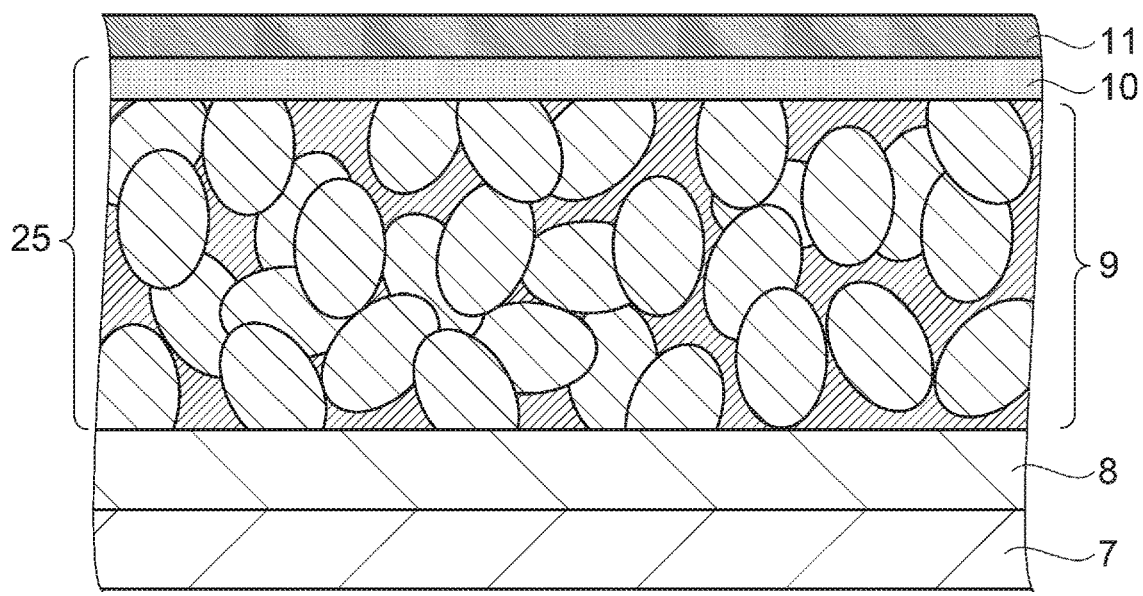
FIG. 15 is a schematic view for explaining the manufacturing method of a lithium battery.

FIG. 15 is a diagram corresponding to the lower electrode providing step of the step S9. As shown in FIG. 15, in the step S9, the carbon sheet 8 is provided on the lower electrode 7. The lower electrode 7 and the carbon sheet 8 may be in contact with each other without being bonded to each other. In addition, the electrode assembly 9 is provided to be overlapped on the carbon sheet 8. The carbon sheet 8 and the electrode assembly 9 may be in contact with each other without being bonded to each other. The battery unit 4 is completed by the steps described above.

Figure 16:
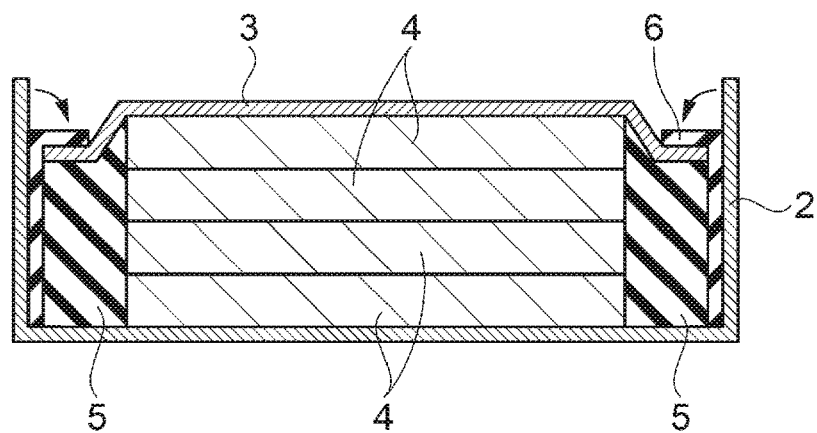
FIG. 16 is a schematic view for explaining the manufacturing method of a lithium battery.

FIG. 16 is a diagram corresponding to the packaging step of the step S10. As shown in FIG. 16, in the step S10, four battery units 4 are overlapped on each other. In a case where the battery units 4 are connected to each other in parallel, insulating sheets are provided between the battery units 4 and wires connecting each battery unit 4 are provided. Then, the battery units 4 are disposed in a center hole of the first insulating portions 5. In addition, the lid portion 3 is provided on the battery units 4. The lid portion 3 is in contact with the battery unit 4.

Next, the second insulating portions 6 are inserted along outer peripheries of the lid portion 3 and side surfaces of the first insulating portions 5. Then, the lid portion 3, the battery units 4, and the first insulating portions 5, to which the second insulating portions 6 are inserted, are provided in the container portion 2. Next, an open end of the container portion 2 is folded to the lid portion 3 side and tightly adhered thereto. Accordingly, each battery unit 4 is pressurized, and thus, the lower electrode 7, the carbon sheet 8, and the electrode assembly 9 are electrically connected. The lithium battery 1 is completed by the steps described above.

Figure 17:
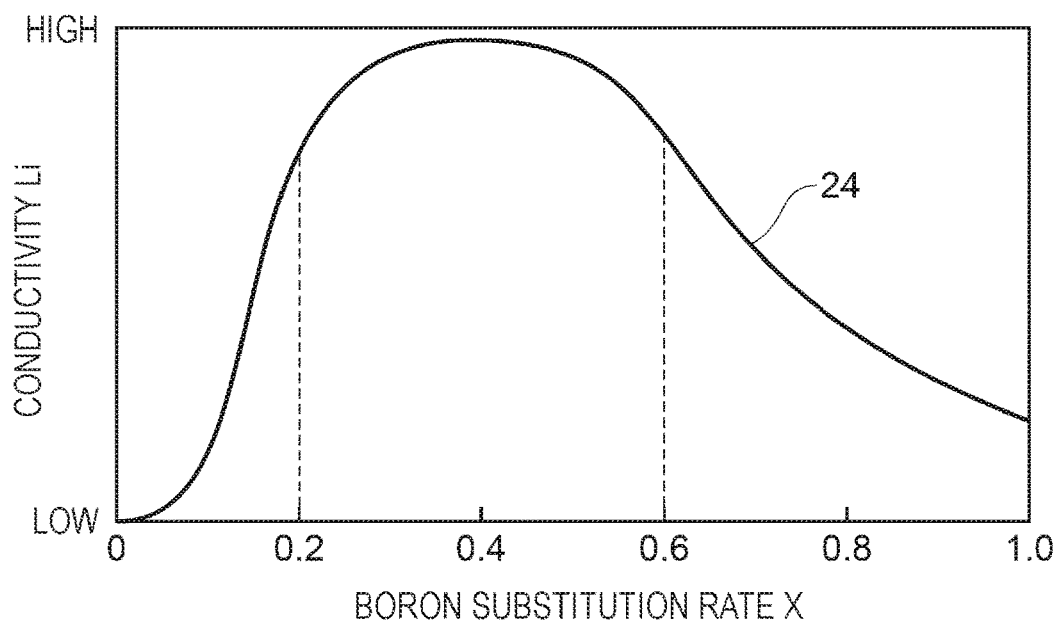
FIG. 17 is a graph showing a relationship between a boron substitution rate X of a solid electrolyte and a Li conductivity of the electrode assembly.

FIG. 17 is a graph showing a relationship between the boron substitution rate X of the solid electrolyte and the Li conductivity of the electrode assembly. In FIG. 17, a horizontal axis shows the boron substitution rate X of the solid electrolyte 22 provided in the electrolyte supplying step of the step S4. The boron substitution rate X is X of $Li_{2+x}C_{1-x}B_xO_3$. A vertical axis shows the Li conductivity of the electrode assembly 9 completed through the slow cooling step of the step S6. A Li conductivity change line 24 shows the Li conductivity with respect to the boron substitution rate X.

As shown with the Li conductivity change line 24, in a case where the boron substitution rate X is lower than 0.2, a change in Li conductivity with respect to the boron substitution rate X is great. In addition, the Li conductivity is lower than that in a case where the boron substitution rate X is 0.2. In a case where the Li conductivity is high, excellent performance of the lithium battery 1 is exhibited, and thus, the boron substitution rate X is preferably set not to be less than 0.2.

In the same manner, in a case where the boron substitution rate X is greater than 0.6, a change in Li conductivity with respect to the boron substitution rate X is great. In addition, the Li conductivity is lower than that in a case where the boron substitution rate X is 0.6. In a case where the Li conductivity is high, excellent performance of the lithium battery 1 is exhibited, and thus, the boron substitution rate X is preferably set not to be a numerical value exceeding 0.6. Therefore, the boron substitution rate X is preferably set as a real number of 0.2 to 0.6. At this time, even in a case where the boron substitution rate X changes, the Li conductivity can be maintained in a high state. A battery having a high Li conductivity can be charged in a short period of time, compared to a battery having a low Li conductivity. The internal resistance decreases at the time of discharging, and thus, a voltage drop can be reduced.

As described above, according to the embodiment, the following effects are obtained.

(1) According to the embodiment, in a case of setting $Li_{2+x}C_{1-x}B_xO_3$ as the solid electrolyte 15, $Li_{2+x}C_{1-x}B_xO_3$ is heated and melted to become liquid, without using a solvent. Accordingly, since the amount of a material vaporized at the time of solidifying the molten material of the solid electrolyte 22 filled in the communication hole 14 is small, it is possible to reduce a volume change of the solid electrolyte 22. Thus, it is possible to decrease a porosity of the communication hole 14 after the solidifying. Therefore, since the communication hole 14 can be filled with the molten material in one step, the solid electrolyte 15 can be provided in the communication hole 14 of the active material aggregate 12 with excellent productivity.

(2) According to the embodiment, the solid electrolyte 22 is heated in a range of 650 degrees to 900 degrees. In a case where the heating temperature is set to be equal to or higher than 650 degrees, the solid electrolyte 22 can be melted. In a case where the heating temperature is equal to or higher than 900 degrees, the composition of the solid electrolyte 22 changes, and thus, the performance of the electrolyte is deteriorated. Accordingly, by setting the heating temperature of the solid electrolyte 22 to be in range described above, the solid material of the solid electrolyte 22 can be melted without deteriorating the performance of the electrolyte.

(3) According to the embodiment, the range of X of $Li_{2+x}C_{1-x}B_xO_3$ is a real number of 0.2 to 0.6. At this time, even in a case where the boron substitution rate X changes, a high Li conductivity of the solid electrolyte can be stably maintained.

(4) According to the embodiment, the electrode assembly 9 is interposed between the lower electrode 7 and the upper electrode 11 in the battery unit 4. The electrode assembly 9 is the electrode assembly 9 capable of being manufactured with excellent productivity, and thus, the battery unit 4 can be set as a battery including the electrode assembly 9 capable of being manufactured with excellent productivity.

(5) According to the embodiment, the lithium battery 1 includes four battery units 4. The battery unit 4 includes the electrode assembly 9 capable of being manufactured with excellent productivity. Accordingly, the lithium battery 1 of the embodiment can be set as a battery including the electrode assembly 9 capable of being manufactured with excellent productivity.

Second Embodiment

Next, one specific embodiment of the electrode assembly of the invention will be described with reference to a schematic sectional side view showing a structure of an electrode assembly of FIG. 18. The embodiment is different from the first embodiment in that the separation layer 10 shown in FIG. 13 is the same material as the solid electrolyte 15 and is connected thereto. The description regarding the same points as those in the first embodiment will be omitted.

Figure 18:
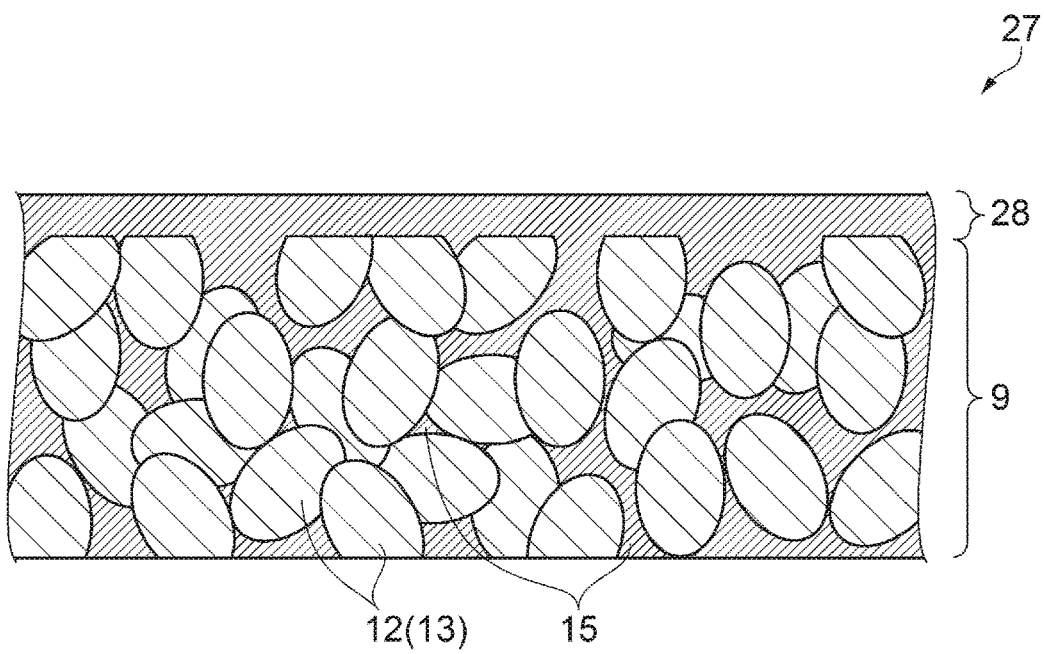
FIG. 18 is a schematic sectional side view showing a structure of an electrode assembly according to a second embodiment.

That is, in the embodiment, as shown in FIG. 18, a separation layer-attached electrode assembly 27 as the electrode assembly includes a layer of the electrode assembly 9 as the first layer and a separation layer 28 as the second layer, and the solid electrolyte 15 of the electrode assembly 9 and the solid electrolyte of the separation layer 28 are connected to each other. The solid electrolyte 15 and the separation layer 28 formed as described above have a connected crystal structure, and the separation layer-attached electrode assembly 27 having a preferable conductivity of Li ions can be obtained.

In the first embodiment, the communication hole 14 of the active material particles 13 was filled with the solid electrolyte 15 in the step S3 to step S5. Then, the separation layer 10 was provided in the step S7. In the step S4, the amount of the solid electrolyte 22 provided on the active material aggregate 12 is set as the amount with which the separation layer 10 can be formed on the active material aggregate 12 after the solidification and crystallization. Accordingly, the separation layer 28 is formed on the active material aggregate 12 in the slow cooling step of the step S6. In the embodiment, the step S7 is omitted and the step S8 is performed after the step S6. Thus, the electrode assembly 9 provided with the separation layer 28 can be manufactured with a small number of steps. In the embodiment, the step S1 to the step S6 are also the manufacturing method of the electrode assembly.

A material of the solid electrolyte 15 is filled with the active material aggregate 12 of the electrode assembly 9, and then, the solid electrolyte 22 is provided on the electrode assembly 9. In this method, the electrode assembly 9 and the separation layer 28 can be continuously provided. Accordingly, the separation layer-attached electrode assembly 27 can be set as the separation layer-attached electrode assembly 27 having a configuration capable of manufacturing the electrode assembly 9 and the separation layer 28 with excellent productivity.

The embodiment is not limited to the embodiments described above, and various changes and improvements can be added within technical ideas of the invention by a person having ordinary skill in the field.

Modification Example 1

In the embodiments described above, the active material disc 21 was formed from the green sheet 17. The active material disc 21 may be molded by putting and pressing a material into a molding die.

Modification Example 2

In the embodiments described above, the solid electrolyte 22 was heated by using the electric furnace in the filling step of the step S5. The solid electrolyte 22 may be heated by other methods. For example, the solid electrolyte may be irradiated with laser beams or high frequency electromagnetic waves. In addition, the solid electrolyte 22 may be melted and added dropwise to the active material aggregate 12.

Modification Example 3

In the embodiments described above, the component obtained by filling the communication hole 14 of the active material particles 13 with the solid electrolyte 15 was set as the electrode assembly 9. In addition, the aspect provided with the separation layer 10 may be set as the separation layer-attached electrode assembly 25 as the electrode assembly shown in FIG. 13.

Modification Example 4

In the embodiments described above, the separation layer 10 was provided on the electrode assembly 9 in the battery unit 4 of the lithium battery 1. A battery unit in which the separation layer-attached electrode assembly 25 shown in Modification Example 3 is interposed between the upper electrode 11 and the lower electrode 7 may be obtained. In addition, a lithium battery may be obtained by using this battery unit. Further, a lithium battery capable of being manufactured with excellent productivity can be obtained.

Third Embodiment

Figure 19:
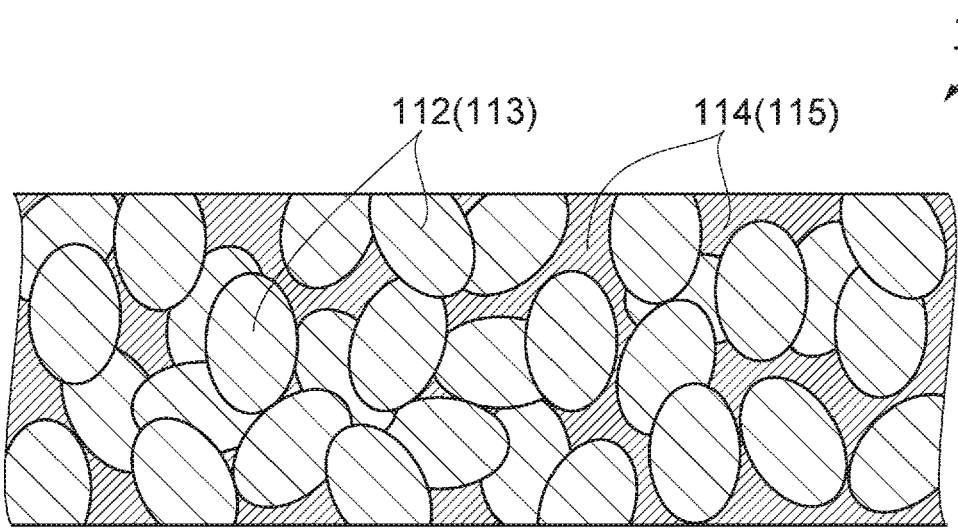
FIG. 19 is a schematic sectional side view of main parts showing a structure of the electrode assembly.

In the embodiment, a specific example of a lithium battery including an electrode assembly and a manufacturing method of a lithium battery of manufacturing this lithium battery will be described with reference to the drawings. In the manufacturing method of a lithium battery, an electrode assembly is included. The electrode assembly according to the embodiment will be described with reference to FIG. 19. FIG. 19 is a schematic sectional side view of main parts showing a structure of the electrode assembly. As shown in FIG. 19, an electrode assembly 109 includes an active material formed body 112. The active material formed bodies 112 area structure in which a plurality of active material particles 113 which are formation materials are connected to each other and formed to be porous. A communication hole 114 is positioned between the active material particles 113. The communication hole 114 has a shape of a hole in which cavities between the active material particles 113 are connected to each other in a ramified manner.

A crystalline solid electrolyte 115 is provided in the communication hole 114. Since the communication hole 114 is provided in a ramified manner, wide areas of the active material formed body 112 and the solid electrolyte 115 are in contact with each other. Accordingly, lithium ions easily move between the active material formed body 112 and the solid electrolyte 115. In addition, the communication hole 114 between the active material formed bodies 112 is filled with the solid electrolyte 115. Accordingly, the solid electrolyte 115 is a connected component in a ramified manner. Lithium ions move in the solid electrolyte 115. Since the communication hole 114 is filled with the solid electrolyte 115 in a ramified manner, paths where lithium ions can move are ensured in every corner of the active material formed bodies 112. In addition, the solid electrolyte 115 is amorphous, and resistance in a grain boundary is low, and thus, lithium ions can easily move. As a result, a lithium battery 101 can stably perform a charge-discharge cycle.

A lithium complex oxide can be used as the formation material of the active material particles 113. A component which is an oxide which essentially includes lithium and includes two or more kinds of metal ions, and in which oxo acid ions do not exist, is referred to as a lithium complex oxide. Examples of the lithium complex oxide include $LiCoO_2$, $LiNiO_2$, $LiMn_2O_4$, $Li_2Mn_2O_3$, $LiFePO_4$, $Li_2FeP_2O_7$, $LiMnPO_4$, $LiFeBO_3$, $Li_3V_2(PO_4)_3$, $Li_2CuO_2$, $LiFeF_3$, $Li_2FeSiO_4$, and $Li_2MnSiO_4$.

In addition, solid solutions in which some atoms of these lithium complex oxides are substituted with other transition metals, typical metals, alkali metals, alkaline rare earths, lanthanoid, chalcogenide, or halogen may also be included in the lithium complex oxide, and these solid solutions can also be used as a cathode active material. In the embodiment, $LiCoO_2$ is used as the active material particles 113, for example.

An average particle diameter of the active material particles 113 is preferably 300 nm to 5 µm, more preferably 450 nm to 3 µm, and even more preferably 500 nm to 1 µm. In a case of using the active material particles 113 having this average particle diameter, a percentage of the communication hole 114 included in the active material formed body 112 can be set to be in a preferable range.

Accordingly, a surface area of the active material formed body 112 can be relatively increased, thereby increasing a contact area of the active material formed body 112 and the solid electrolyte 115.

$Li_{2+x}C_{1-x}B_xO_3$ is used as a material of the solid electrolyte 115. X is a substitution rate of boron B and represents a real number exceeding 0 and equal to or smaller than 1. Accordingly, the solid material of the solid electrolyte 115 does not include $Li_2CO_3$, in a case where X is 0, but includes $Li_3BO_3$, in a case where X is 1. The solid electrolyte 115 is an amorphous material in the communication hole 114.

Figure 20:
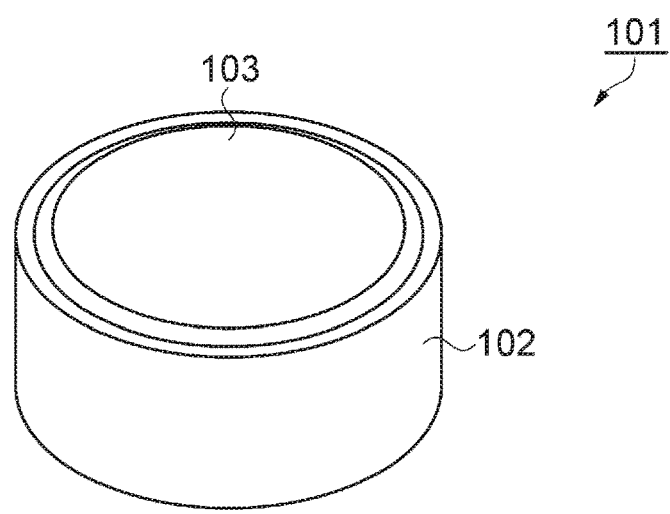
FIG. 20 is a schematic perspective view showing a structure of a lithium battery.

Next, the lithium battery will be described with reference to FIGS. 20 to 23. FIG. 20 is a schematic perspective view showing a structure of the lithium battery. As shown in FIG. 20, the lithium battery 101 as the battery includes a container portion 102 having a bottomed cylindrical shape, and a lid portion 103. One of the container portion 102 and the lid portion 103 is a cathode and the other one is an anode. The lithium battery 101 is an all-solid type secondary battery capable of power storing, but may be used as a primary battery. The electrode assembly 109 is used in the lithium battery 101.

Figure 21:
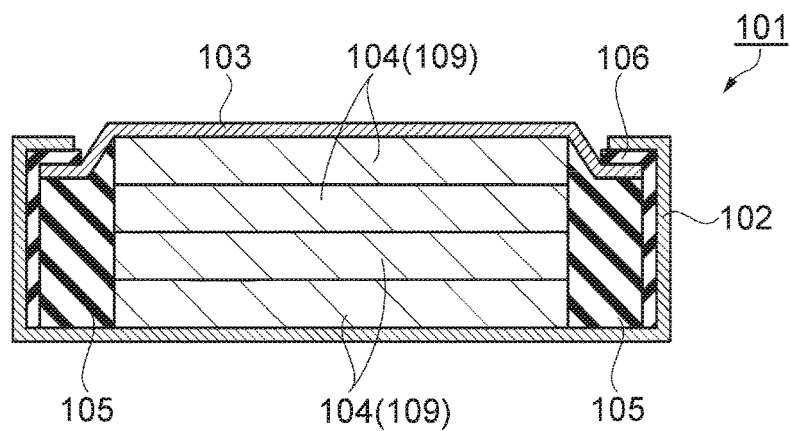
FIG. 21 is a schematic sectional view showing a structure of the lithium battery.

FIG. 21 is a schematic sectional view showing a structure of the lithium battery 101. As shown in FIG. 21, four battery units 104 as disc-shaped batteries are provided in the container portion 102 in an overlapped manner. The battery units 104 are overlapped in a columnar shape. The electrode assembly 109 is used in each battery unit 104. The number of battery units 104 provided in one lithium battery 101 is not particularly limited. The number thereof may be 1 to 3 or may be equal to or greater than 5. The battery units 104 are used with power of approximately 2.8 v to approximately 4.2 v. By combining parallel connection and series connection for the connection of the plurality of battery units 104, it is possible to adjust a voltage value necessary for the lithium battery 101.

First insulating portions 105 having a cylindrical shape are provided around the overlapped battery units 104. The lid portion 103 is provided on the upper side of the drawing of the battery units 104 and the first insulating portions 105, and second insulating portions 106 are provided on the outer peripheral side of the lid portion 103 and the side surface side of the first insulating portions 105. The second insulating portions 106 are positioned between the container portion 102 and the lid portion 103 and also positioned between the container portion 102 and the first insulating portions 105.

The first insulating portions 105 fix the battery units 104 so that the battery units 104 do not move in a horizontal direction of the drawing. In addition, the first insulating portions 105 performs insulation so that side surfaces of the battery units 104 are not electrically connected to the container portion 102. The second insulating portions 106 insulate the container portion 102 and the lid portion 103 from each other. The material of the container portion 102 and the lid portion 103 is not particularly limited, as long as it has conductivity and rigidity, and metals having corrosion resistance, or metals having surfaces subjected to surface treatment of corrosion resistance can be used. In the embodiment, stainless steel is, for example, used as the material of the container portion 102 and the lid portion 103. The material of the first insulating portions 105 and the second insulating portions 106 is not particularly limited, as long as it has insulating properties, and a resin material is preferably used for ease of processing. In the embodiment, an aryl resin is used as the material of the first insulating portions 105 and the second insulating portions 106.

Figure 22:
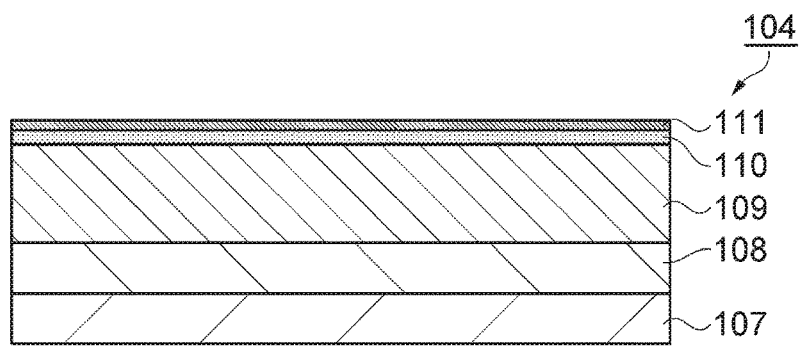
FIG. 22 is a schematic side view showing a structure of a battery unit.

FIG. 22 is a schematic side view showing a structure of the battery unit. As shown in FIG. 22, the battery unit 104 includes a lower electrode 107 as a first electrode. A carbon sheet 108, the electrode assembly 109 as a first layer, a separation layer 110 as a second layer, and an upper electrode 111 as a second electrode are overlapped on each other in this order and provided on the lower electrode 107. A thickness of each portion is not particularly limited, and in the embodiment, a thickness of the lower electrode 107 is approximately 100 µm, a thickness of the carbon sheet 108 is approximately 100 µm, a thickness of the electrode assembly 109 is approximately 300 µm, a thickness of the separation layer 110 is approximately 2 µm, and a thickness of the upper electrode 111 is approximately 2 µm, for example.

The lower electrode 107 is an electrode which is a cathode and functions as a substrate which maintains a structure. As the material of the lower electrode 107, one kind of metal selected from the group consisting of copper, magnesium, titanium, iron, cobalt, nickel, zinc, aluminum, germanium, indium, gold, platinum, silver, and palladium, or an alloy including two or more kinds of metals selected from this group can be used. In the embodiment, copper is used as the material of the lower electrode 107, for example. The carbon sheet 108 is a carbon film which allows a current to efficiently flow between the lower electrode 107 and the electrode assembly 109.

The separation layer 110 is a film which prevents short circuit of the electrode assembly 109 and the upper electrode 111 and is a film configured with lithium triborate (LBO), lithium carbon borate (LCBO), and the like. In the embodiment, LCBO was used in the separation layer 110, for example. In addition, the upper electrode 111 is an electrode which is an anode and a film of lithium was used.

In a case of charging the lithium battery 101, in the solid electrolyte 115, lithium ions move from the active material formed body 112 of the electrode assembly 109 to the upper electrode 111. The upper electrode 111 is an anode of the lithium film. In addition, in a case of discharging, in the solid electrolyte 115, lithium ions move from the upper electrode 111 to the active material formed body 112 of the electrode assembly 109.

Figure 23:
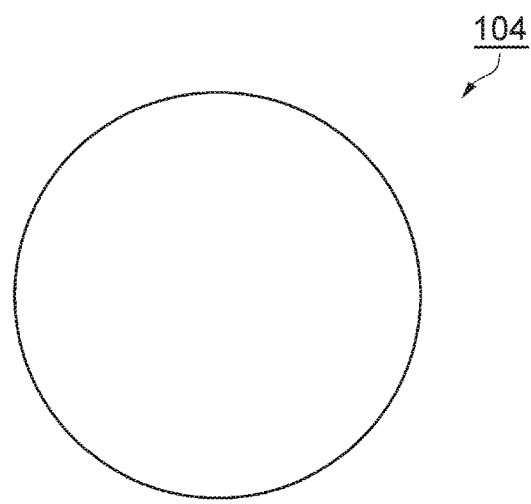
FIG. 23 is a schematic plan view showing a structure of the battery unit.

FIG. 23 is a schematic plan view showing a structure of the battery unit. A planar shape of the battery unit 104 is not particularly limited, and in the embodiment, the planar shape thereof is, for example, a circle, as shown in FIG. 23. In the embodiment, as a shape matched with this, the lower electrode 107, the carbon sheet 108, and the electrode assembly 109 also has a disc shape. A diameter of the battery unit 104 is not particularly limited, and in this embodiment, the diameter thereof is, for example, set as 10 mm to 20 mm.

Figure 24:
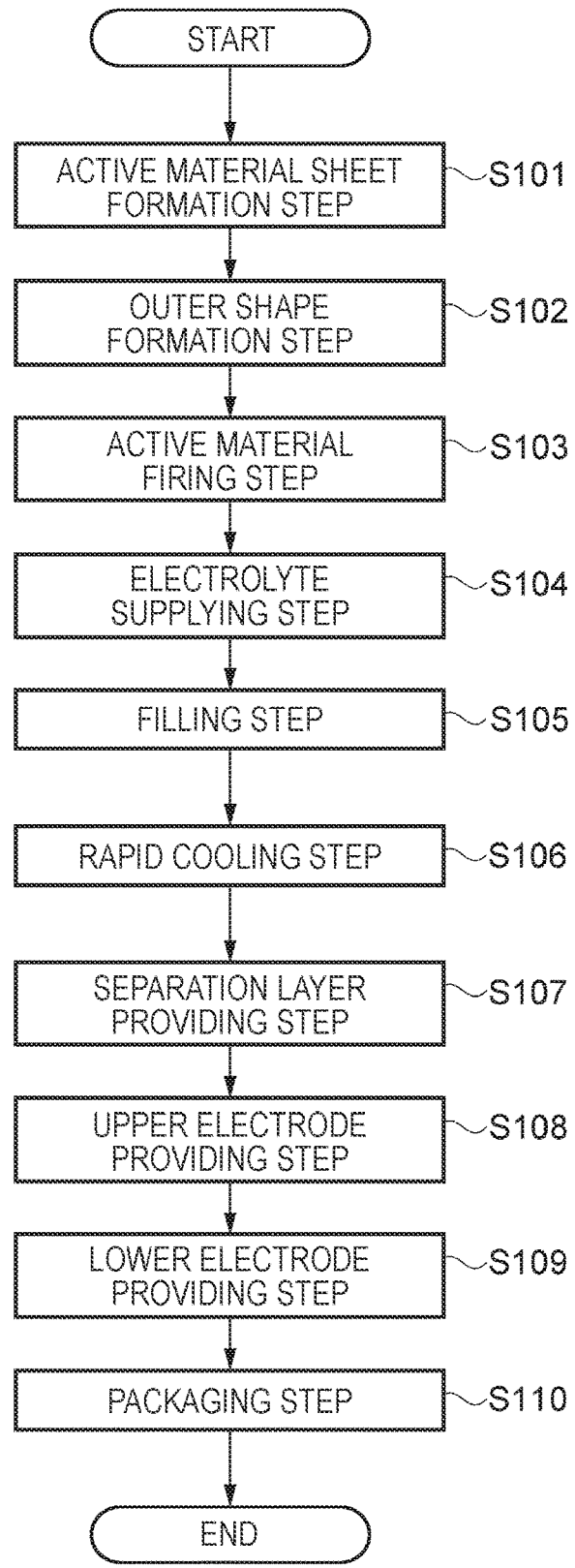
FIG. 24 is a flowchart of a manufacturing method of a lithium battery.

Next, a manufacturing method of the lithium battery 101 described above will be described with reference to FIGS. 24 to 35. FIG. 24 is a flowchart of the manufacturing method of the lithium battery, and FIGS. 25 to 34 are schematic views for explaining the manufacturing method of the lithium battery. In the flowchart of FIG. 24, a step S101 is an active material sheet formation step. This step is a step of mixing the active material particles 113 and a binder with each other to obtain a sheet shape. Then, the process proceeds to a step S102. The step S102 is an outer shape formation step. This step is a step of forming an outer shape of an intermediate product of the active material formed body 112. The intermediate product is referred to as a product which is in the middle stage to the completion. Then, the process proceeds to a step S103. The step S103 is an active material firing step. This step is a step of removing the binder from the intermediate product of the active material formed body 112 and sintering the active material particles 113. Then, the process proceeds to a step S104.

The step S104 is an electrolyte supplying step. This step is a step of supplying a material of the solid electrolyte 115 onto the active material formed body 112. Then, the process proceeds to a step S105. The step S105 is a filling step. This step is a step of filling the communication hole 114 of the active material formed body 112 by heating and melting the material of the solid electrolyte 115. Then, the process proceeds to a step S106. The step S106 is a rapid cooling step. This step is a step of rapidly cooling the active material formed body 112 filled with the material of the solid electrolyte 115. The electrode assembly 109 is completed in the step S106. Then, the process proceeds to a step S107.

The step S107 is a separation layer providing step. This step is a step of providing the separation layer 110 on one surface of the electrode assembly 109. Then, the process proceeds to a step S108. The step S108 is an upper electrode providing step. This step is a step of providing the upper electrode 111 to be overlapped on the separation layer 110. Then, the process proceeds to a step S109. The step S109 is a lower electrode providing step. This step is a step of providing the carbon sheet 108 and the lower electrode 107 on the other surface of the electrode assembly 109. The battery unit 104 is completed in the step S109. Then, the process proceeds to a step S110. The step S110 is a packaging step. This step is a step of providing the battery units 104, the first insulating portions 105, the second insulating portions 106, and the lid portion 103 in the container portion 102 and fixing the lid portion 103 with the container portion 102. The lithium battery 101 is completed by the steps described above. The step S101 to step S103 correspond to a first step, and the step S104 corresponds to a second step. The step S105 corresponds to a third step. The step S106 corresponds to a fourth step.

Next, the manufacturing method will be specifically described corresponding to the steps shown in FIG. 24, with reference to FIGS. 25 to 35.

Figure 25:
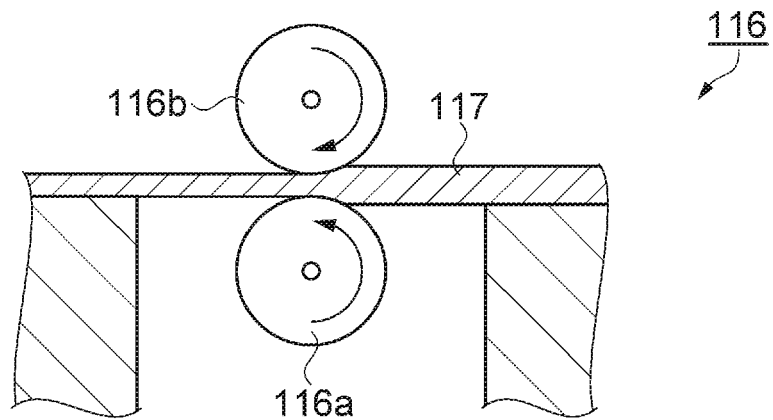
FIG. 25 is a schematic view for explaining the manufacturing method of a lithium battery.

FIG. 25 is a diagram corresponding to the active material sheet formation step of the step S101. In the step S101, a raw material powder of the active material particles 113 is mixed with a binder and the like and made into a paste state. The obtained material is spread and dried in a thin sheet shape on a plastic carrier film. The dried sheet is referred to as a green sheet 117.

The binder is not particularly limited, as long as it can bind the raw powder of the active material particles 113 to each other and be removed by heating. Examples of the binder include a cellulose-based binder, an acrylic-based binder, a polyvinyl alcohol-based binder, and a polyvinyl butyral-based binder, in addition to polycarbonate, and one or a combination of two or more kinds of these can be used.

In addition, a solvent may be used in the active material sheet formation step. The solvent used in the step is not particularly limited, and, for example, aprotic solvents such as butanol, ethanol, propanol, methyl isobutyl ketone, toluene, and xylene can be used. Accordingly, it is possible to reduce a deterioration of the active material particles 113 due to contact with the solvent. These solvents can be used alone or in combination of a plurality of solvents. In the embodiment, as the binder, a material obtained by adding dioxane to polycarbonate is used, for example.

In addition, an organic polymer compound such as polyvinylidene fluoride or polyvinyl alcohol may be added to the binder. A particulate hole forming material may be added to the binder, in order to adjust a size of the communication hole 114. An average particle diameter of the hole forming material is not particularly limited, and is, for example, set as 0.5 µm to 10 µm, in the embodiment. In addition, particles of which a formation material is a substance having deliquescency such as a polyacrylic acid may be added to the binder. Water generated around the particles due to the deliquescence of the particles connects particulate lithium complex oxides to each other. The binder functions as a binder which connects particulate lithium complex oxides to each other.

Next, as shown in FIG. 25, a green sheet 117 is provided in a roller 116. The roller 116 includes a first cylinder 116a and a second cylinder 116b. A central axis of the first cylinder 116a and a central axis of the second cylinder 116b are connected to a rotation axis of a rotation mechanism (not shown). The rotation mechanism is configured with a motor, a speed reducer, and a control device which controls a rotation speed. By the rotation mechanism, the first cylinder 116a rotates counterclockwise and the second cylinder 116b rotates clockwise. A distance between the outer periphery of the first cylinder 116a and the outer periphery of the second cylinder 116b is adjusted as a predetermined distance.

The green sheet 117 is interposed between the first cylinder 116a and the second cylinder 116b from the right side of the drawing. By rotating the first cylinder 116a and the second cylinder 116b, the green sheet 117 is rolled to have a predetermined thickness and discharged to the right side of the drawing. The surfaces of the first cylinder 116a and the second cylinder 116b are processed as mirror surfaces. The surfaces of the first cylinder 116a and the second cylinder 116b are transferred to the rolled green sheet 117, and thus, the surface of the green sheet 117 becomes a flat surface.

Figure 26:
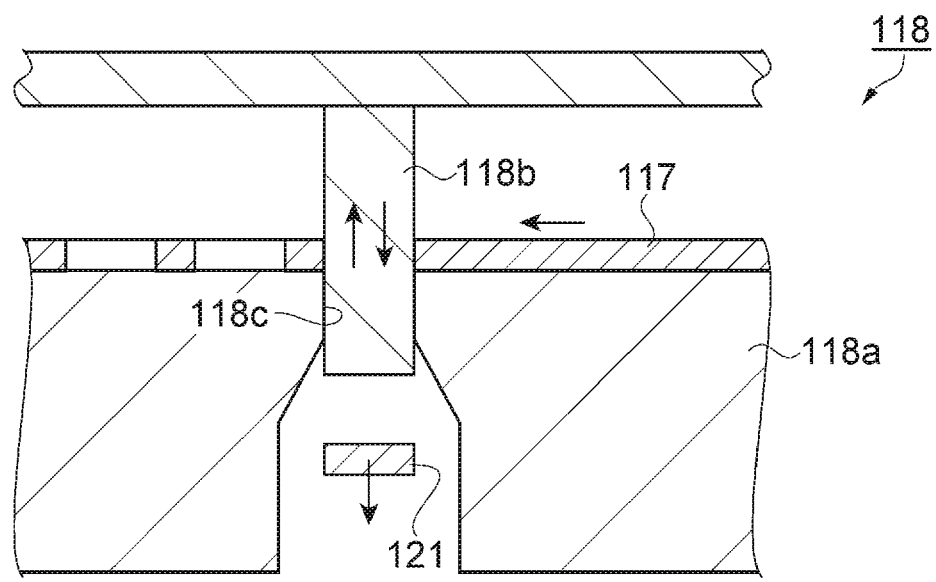
FIG. 26 is a schematic view for explaining the manufacturing method of a lithium battery.

FIG. 26 is a diagram corresponding to the outer shape formation step of the step S102. As shown in FIG. 26, in the step S102, the green sheet 117 is provided in a pressing machine 118. The pressing machine 118 includes a die plate 118a and a punch 118b. A circular hole 118c is provided in the die plate 118a and the punch 118b has a columnar shape. A diameter of the hole 118c and a diameter of the punch 118b become approximately the same dimensions.

An operator provides the green sheet 117 on the die plate 118a. The pressing machine 118 moves the punch 118b in a vertical direction of the drawing. At this time, the green sheet 117 is extruded to the punch 118b and passes through the hole 118c of the die plate 118a. An active material disc 121 which is the green sheet 117 formed in a disc shape is formed. The pressing machine 118 moves the green sheet 117 to the left side of the drawing, and continuously forms the active material disc 121 by vertically moving the punch 118b.

Figure 27:
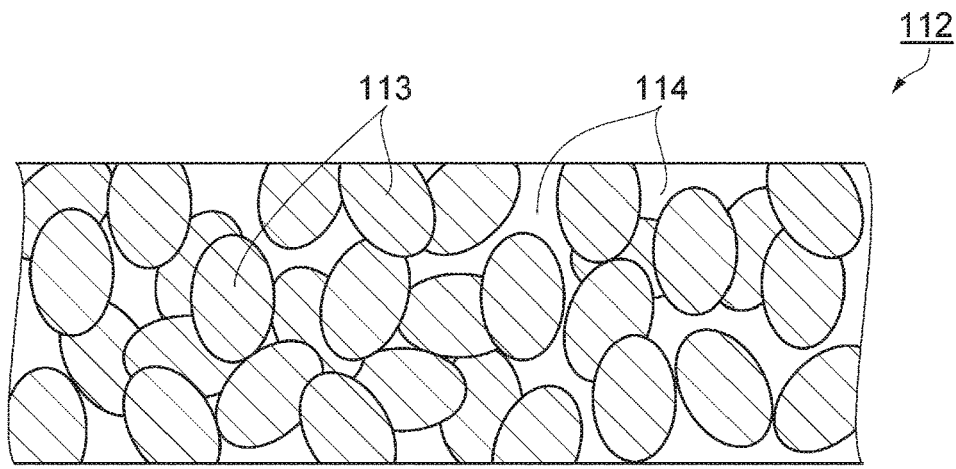
FIG. 27 is a schematic view for explaining the manufacturing method of a lithium battery.

FIG. 27 is a diagram corresponding to the active material firing step of the step S103. In the active material firing step of the step S103, first, a degreasing step of removing the binder from the active material disc 121 is performed. The active material disc 121 is provided in reducing gas and heated in a temperature atmosphere of approximately 150° C. to 500° C. for approximately 0.1 to 20 hours. Accordingly, the binder can be removed from the active material disc 121. Then, the heating is performed to a temperature at which the active material particles 113 are not melted. Since a melting point of $LiCoO_2$ is 1,100° C., the heating is performed to a temperature lower than 1,100° C. The heating temperature and the heating time are not particularly limited, and in the embodiment, the heating temperature is set as 900° C. to 950° C. and the heating time is set as approximately 4 to 14 hours, for example. As a result, as shown in FIG. 27, the active material particles 113 are bonded to each other and the active material formed body 112 is completed. The communication hole 114 is provided between the active material particles 113. The communication hole 114 is cavities formed due to the removal of the binder, and the cavities are connected to each other to be the communication hole 114. The plurality of communication holes 114 are provided in the active material formed body 112, and thus, the active material formed body 112 is also referred to as a porous body or a porous substance.

Figure 28:
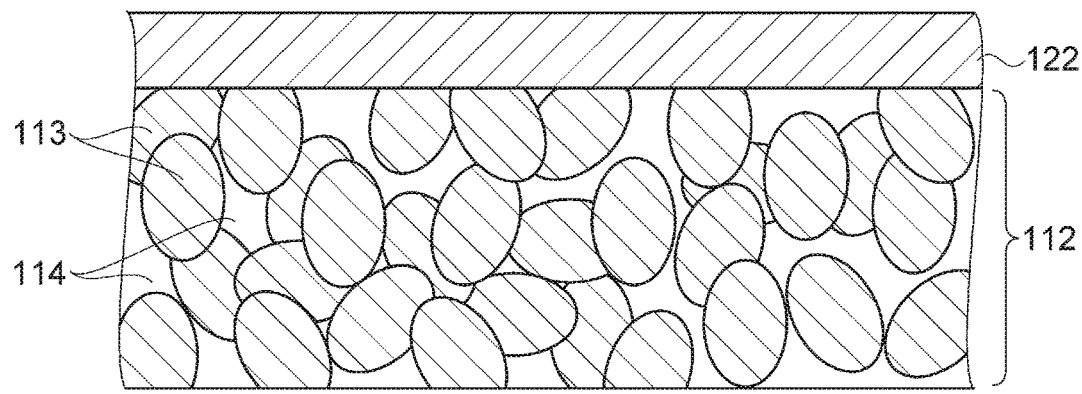
FIG. 28 is a schematic view for explaining the manufacturing method of a lithium battery.

FIG. 28 is a diagram corresponding to the electrolyte supplying step of the step S104. As shown in FIG. 28, in the step S104, a solid electrolyte 122 as a solid material which is a material of the solid electrolyte 115 is supplied onto the active material formed body 112 so as to contact with the active material formed body 112. The solid electrolyte 122 is a material of the solid electrolyte 115 and is a solid material of the solid electrolyte 115. The solid electrolyte 122 is not particularly limited and can be supplied in various aspects such as a powder, a sheet shape, or a block shape. In the embodiment, the solid electrolyte 122 is supplied in a state of powder, for example.

In a case where the X which is a substitution rate of boron B is a real number exceeding 0 and equal to or smaller than 1, the solid electrolyte 122 includes $Li_{2+X}C_{1-X}B_XO_3$. X may be a real number exceeding 0, and for example, in a case where X is 0.1, $Li_{2+X}C_{1-X}B_XO_3$ is $Li_{2.1}C_{0.9}B_{0.1}O_3$, and in a case where X is 1, $Li_{2+X}C_{1-X}B_XO_3$ is $Li_3BO_3$.

Figure 29:
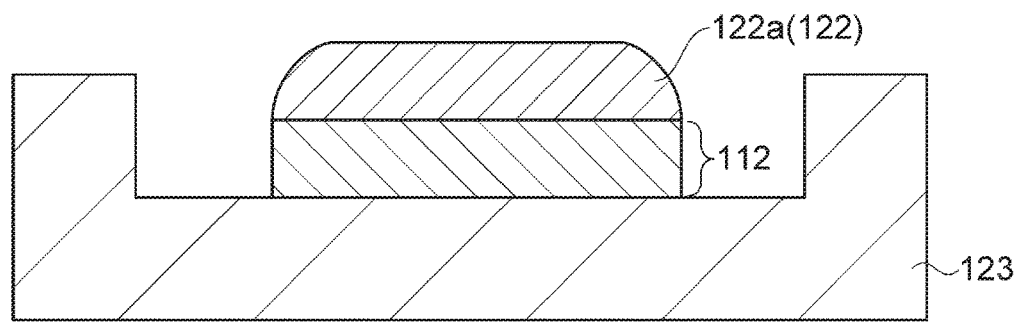
FIG. 29 is a schematic view for explaining the manufacturing method of a lithium battery.
Figure 30:
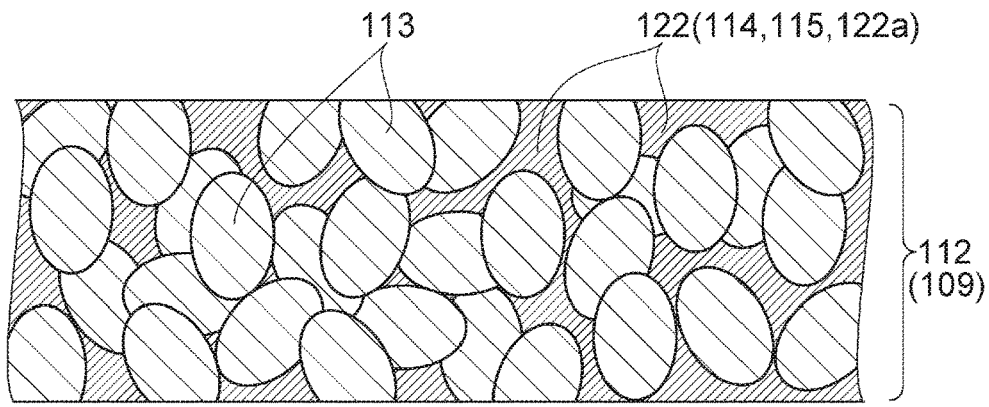
FIG. 30 is a schematic view for explaining the manufacturing method of a lithium battery.

FIGS. 29 and 30 are diagrams corresponding to the filling step of the step S105. As shown in FIG. 29, in the step S105, the active material formed body 112 is loaded on a container 123. The container 123 has heat resistance and withstands a high temperature equal to or higher than 1,000 degrees. As the material of the container 123, Mo, W, Ta, Ir, Nb, and the like can be used, for example. In addition, a Ti-made container including a mechanism of performing cooling by water and the like may be used.

Then, the active material formed body 112 and the solid electrolyte 122 are heated. A dissolving method of the solid electrolyte 122 is not particularly limited, as long as it is a method capable of performing heating at a temperature equal to or higher than the melting point. As a heating source, arc discharge, laser electron beams, light, infrared rays, or a high frequency can be used, for example. The solid electrolyte 122 substantially does not have electronic conductivity at a temperature close to room temperature. In a case of using a high frequency, the solid electrolyte 122 is accommodated in the container 123 having a melting point higher than a melting point of the conductive and solid electrolyte 122. Then, the container 123 is heated and heat is transferred from the container 123 to the active material formed body 112 and the solid electrolyte 122.

The dissolving of the solid electrolyte 122 may be performed in various atmospheres such as in the atmosphere, in inert gas, in reducing gas, in hydrocarbon gas, and in vacuum. In a case where the container 123 is easily oxidized in a high temperature environment, the dissolving is desirably performed in the insert gas atmosphere such as argon gas or helium gas, or in vacuum. In addition, in a case of dissolving the solid electrolyte 122 due to arc discharge, it is necessary that sufficient argon gas for occurring arc discharge is included in the atmosphere. The solid electrolyte 122 is heated and melted. The melted solid electrolyte 122 is referred to as a molten material 122a.

As shown in FIG. 30, gravity works in the molten material 122a and the communication holes 114 of the active material formed body 112 are filled with the molten material 122a. In addition, a capillary phenomenon occurs in the molten material 122a and the communication holes 114 are easily filled with the molten material 122a. A porous structure such as a porous ceramic may be provided between the container 123 and the active material formed body 112. The molten material 122a of the solid electrolyte 122 overflowed from the active material formed body 112 may be adsorbed to the porous structure.

In a case where the solid electrolyte 122 is filled, the solid electrolyte 122 is heated and melted to become liquid, without using a solvent. Since the amount of a material vaporized at the time of solidifying the molten material 122a filled in the communication hole 114 is small, it is possible to reduce a volume change, in a case where the molten material 122a becomes the solid electrolyte 115. Therefore, it is possible to decrease a porosity of the communication hole 114 after solidifying the molten material 122a.

At the time of melting the solid electrolyte 122, the solid electrolyte 122 is heated in a range of 650 degrees to 900 degrees. By setting the heating temperature to be equal to or higher than 650 degrees, the solid electrolyte 122 can be melted. In a case where the heating temperature is equal to or higher than 900 degrees, the composition of the solid electrolyte 122 changes, and thus, the performance of the electrolyte is deteriorated. Accordingly, by setting the heating temperature of the solid electrolyte 122 to be in a range of 650 degrees to 900 degrees, the solid electrolyte 122 can be melted without deteriorating the performance of the electrolyte.

In addition, the heating temperature at the time of melting the solid electrolyte 122 is preferably 700 degrees to 850 degrees. Further, it is preferable to change the heating temperature of the solid electrolyte 122 in accordance with the composition of the solid electrolyte 122. Since the melting temperature changes in accordance with the value of the boron substitution rate X of $Li_{2+X}C_{1-X}B_XO_3$, it is preferable to change the heating temperature, in a case of dissolving the solid electrolyte 122.

The heating time of the solid electrolyte 122 is not limited, because the heating time changes in accordance with the amount of the solid electrolyte 122. In a case where the heating time is long, the composition of the solid electrolyte 122 changes, and thus, the heating time is preferably short. The heating time in a case where the amount of the solid electrolyte 122 is 20 mg, is preferably 4 minutes to 6 minutes. In the embodiment, the heating time in a case where the amount of the solid electrolyte 122 is 20 mg was, for example, set as 5 minutes.

In the rapid cooling step of the step S106, the active material formed body 112 including molten material 122a is rapidly cooled. By rapidly cooling, the molten material 122a is non-crystallized. A method of non-crystallizing the molten material 122a is not particularly limited, and the active material formed body 112 may be cooled and the cooling may be performed including the container 123. In the embodiment, for example, the heated active material formed body 112 is loaded on a cooled support having large heat capacity, and thus, the dissolved solid electrolyte 122 was rapidly cooled.

A cooling speed of rapidly cooling the dissolved solid electrolyte 122 is preferably $10^2$ degree/sec to $10^3$ degree/sec. A cooling speed of rapidly cooling the molten material 122a of the solid electrolyte 122 is equal to or higher than $10^2$ degree/sec. At this cooling speed, the solid electrolyte 115 can be non-crystallized, in a case where the molten material 122a is solidified. A non-crystallized state is referred to as a non-crystallization or amorphous state. In addition, the cooling speed is equal to or lower than $10^3$ degree/sec. At this time, a device of cooling the molten material 122a can be easily prepared. In the embodiment, the cooling speed of rapidly cooling the molten material 122a was, for example, 300 degree/min. Accordingly, the molten material 122a is solidified and the amorphous solid electrolyte 115 is obtained.

Figure 31:
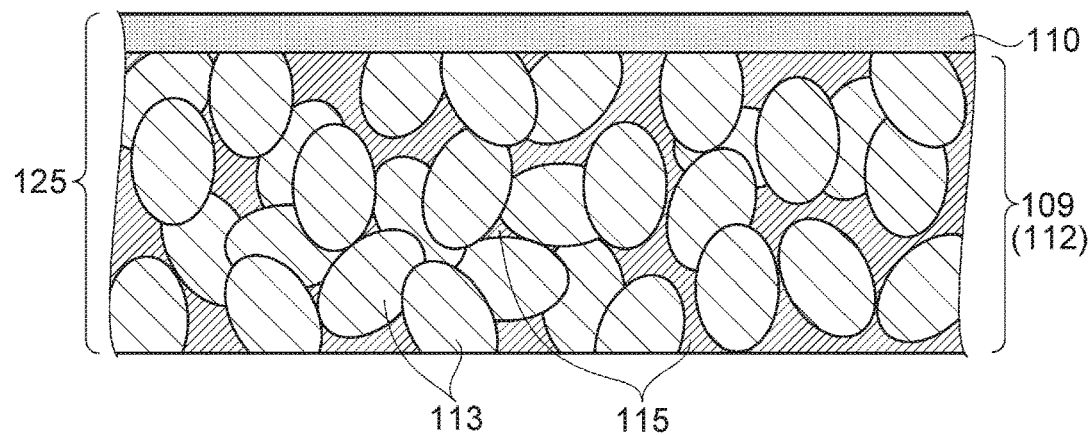
FIG. 31 is a schematic view for explaining the manufacturing method of a lithium battery.

FIG. 31 is a diagram corresponding to the separation layer providing step of the step S107. As shown in FIG. 31, in the step S107, the separation layer 110 is provided on the active material formed body 112. The separation layer 110 is a film of LCBO. A film forming method of the separation layer 110 is not particularly limited, and a liquid phase film forming method such as a coating method or a spraying method can be used, in addition to a gas phase film forming method such as a sputtering method or a vacuum deposition method. In the embodiment, the separation layer 110 was completed by using a sputtering method, for example.

Figure 32:
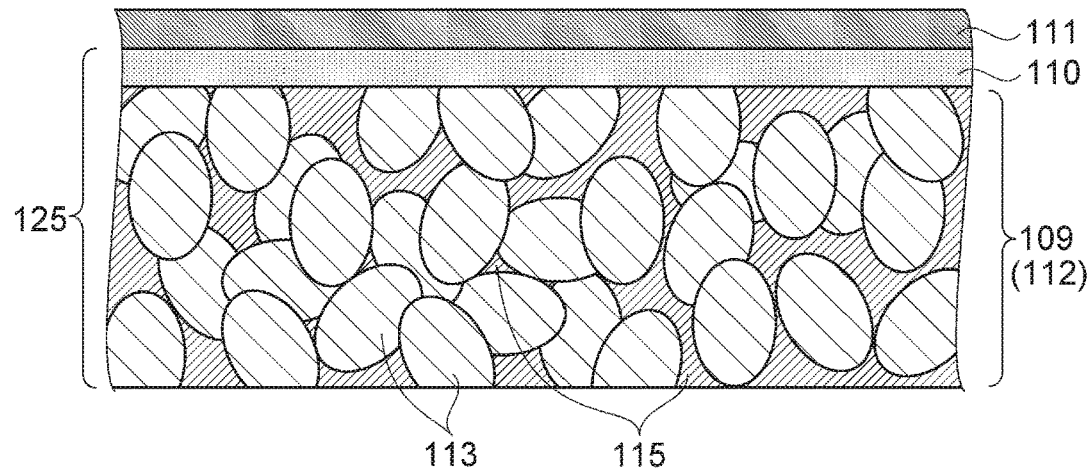
FIG. 32 is a schematic view for explaining the manufacturing method of a lithium battery.

FIG. 32 is a diagram corresponding to the upper electrode providing step of the step S108. As shown in FIG. 32, in the step S108, the upper electrode 111 is provided on the separation layer 110. The upper electrode 111 is a film of lithium. As a film forming method of the upper electrode 111, the same method used for the separation layer 110 can be used, and the film forming method is not particularly limited. In the embodiment, the upper electrode 111 was formed by using a vacuum deposition method, for example.

Figure 33:
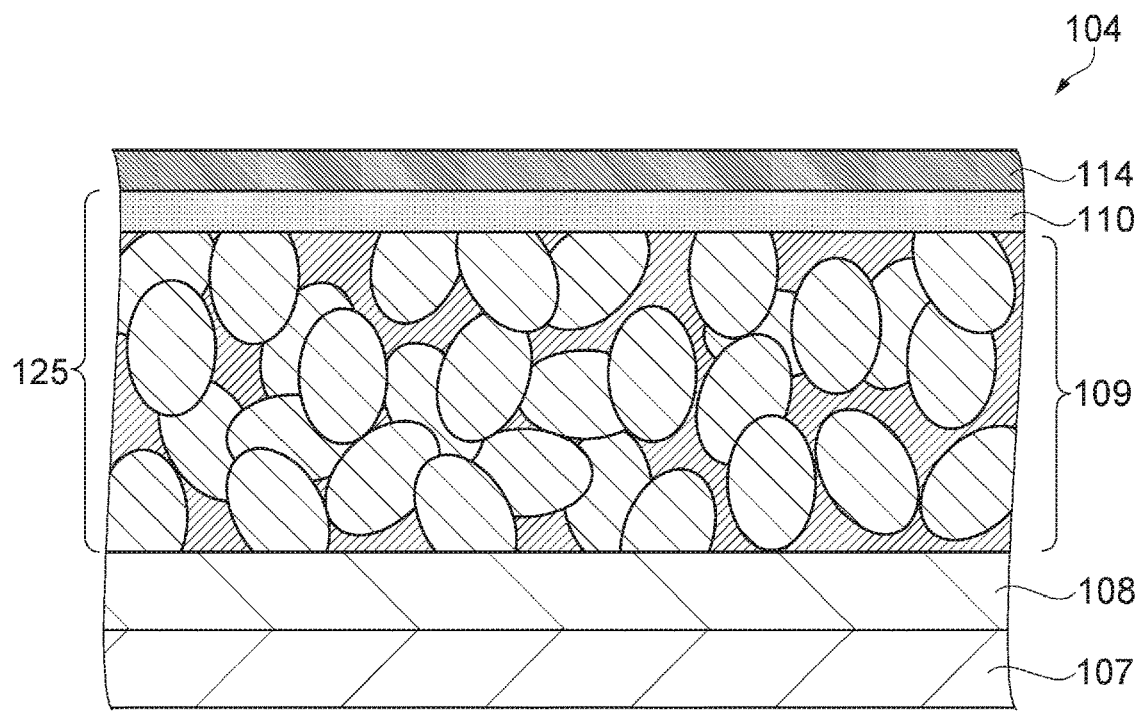
FIG. 33 is a schematic view for explaining the manufacturing method of a lithium battery.

FIG. 33 is a diagram corresponding to the lower electrode providing step of the step S109. As shown in FIG. 33, in the step S109, the carbon sheet 108 is provided on the lower electrode 107. The lower electrode 107 and the carbon sheet 108 may be in contact with each other without being bonded to each other. In addition, the electrode assembly 109 is provided to be overlapped on the carbon sheet 108. The carbon sheet 108 and the electrode assembly 109 may be in contact with each other without being bonded to each other. The battery unit 104 is completed by the steps described above.

Figure 34:
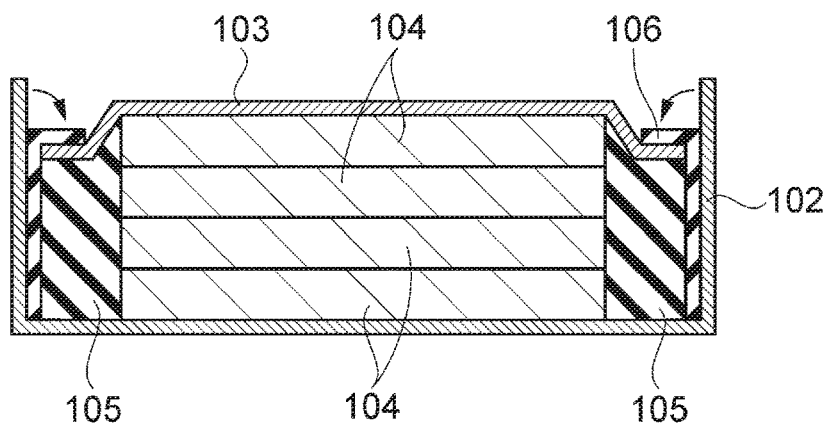
FIG. 34 is a schematic view for explaining the manufacturing method of a lithium battery.

FIG. 34 is a diagram corresponding to the packaging step of the step S110. As shown in FIG. 34, in the step S110, four battery units 104 are overlapped on each other. In a case where the battery units 104 are connected to each other in parallel, insulating sheets are provided between the battery units 104 and wires connecting each battery unit 104 are provided. Then, the battery units 104 are disposed in a center hole of the first insulating portions 105. In addition, the lid portion 103 is provided on the battery units 104. The lid portion 103 is in contact with the battery unit 104.

Next, the second insulating portions 106 are inserted along outer peripheries of the lid portion 103 and side surfaces of the first insulating portions 105. Then, the lid portion 103, the battery units 104, and the first insulating portions 105, to which the second insulating portions 106 are inserted, are provided in the container portion 102. Next, an open end of the container portion 102 is folded to the lid portion 103 side and tightly adhered thereto. Accordingly, each battery unit 104 is pressurized, and thus, the lower electrode 107, the carbon sheet 108, and the electrode assembly 109 are electrically connected. The lithium battery 101 is completed by the steps described above.

Figure 35:
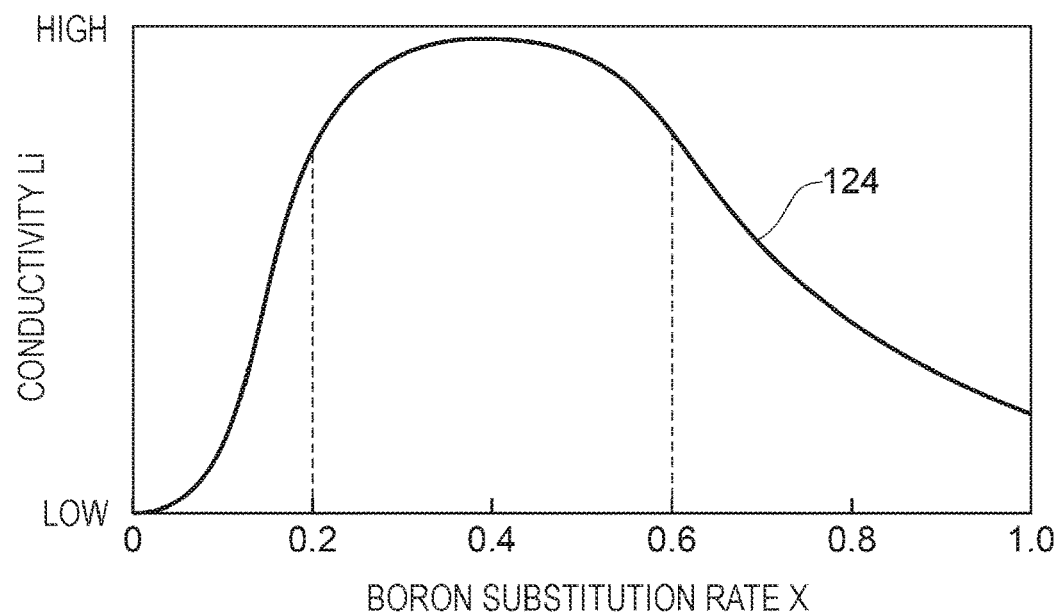
FIG. 35 is a graph showing a relationship between a boron substitution rate X of a solid electrolyte and a Li conductivity of the electrode assembly.

FIG. 35 is a graph showing a relationship between the boron substitution rate X of the solid electrolyte and the Li conductivity of the electrode assembly. In FIG. 35, a horizontal axis shows the boron substitution rate X of the solid electrolyte 122 provided in the electrolyte supplying step of the step S104. The boron substitution rate X is X of $Li_{2+x}C_{1-x}B_xO_3$. A vertical axis shows the Li conductivity of the electrode assembly 109 completed through the rapid cooling step of the step S106. A Li conductivity change line 124 shows the Li conductivity with respect to the boron substitution rate X.

As shown with the Li conductivity change line 124, in a case where the boron substitution rate X is lower than 0.2, a change in Li conductivity with respect to the boron substitution rate X is great. In addition, the Li conductivity is lower than that in a case where the boron substitution rate X is 0.2. In a case where the Li conductivity is high, excellent performance of the lithium battery 101 is exhibited, and thus, the boron substitution rate X is preferably set not to be less than 0.2.

In the same manner, in a case where the boron substitution rate X is greater than 0.6, a change in Li conductivity with respect to the boron substitution rate X is great. In addition, the Li conductivity is lower than that in a case where the boron substitution rate X is 0.6. In a case where the Li conductivity is high, excellent performance of the lithium battery 101 is exhibited, and thus, the boron substitution rate X is preferably set not to be a numerical value exceeding 0.6. Therefore, the boron substitution rate X is preferably set as a real number of 0.2 to 0.6. At this time, even in a case where the boron substitution rate X changes, the Li conductivity can be maintained in a high state. A battery having a high Li conductivity can be charged in a short period of time, compared to a battery having a low Li conductivity. The internal resistance decreases at the time of discharging, and thus, a voltage drop can be reduced.

As described above, according to the embodiment, the following effects are obtained.

(1) According to the embodiment, in a case of setting $Li_{2+x}C_{1-x}B_xO_3$ as the solid electrolyte 115, $Li_{2+x}C_{1-x}B_xO_3$ is heated and melted to become liquid, without using a solvent. Accordingly, since the amount of a material vaporized at the time of solidifying the molten material 122a of the solid electrolyte 122 filled in the communication hole 114 is small, it is possible to reduce a volume change of the solid electrolyte 122. Thus, it is possible to decrease a porosity of the communication hole 114 after the solidifying. Therefore, since the communication hole 114 can be filled with the molten material 122a in one step, the solid electrolyte 115 can be provided in the communication hole 114 of the active material formed body 112 with excellent productivity.

(2) According to the embodiment, the solid electrolyte 122 is dissolved in the step S105. The communication hole 114 is filled with the molten material 122a. Accordingly, the active material formed body 112 and the molten material 122a are integrally formed. Then, the molten material 122a is rapidly cooled, solidified, and non-crystallized. In the amorphous aspect, resistance in a grain boundary is low, and thus, lithium ions can easily move in the solid electrolyte 115.

(3) According to the embodiment, the cooling speed of rapidly cooling the molten material 122a is equal to or higher than $10^2$ degree/sec. At this cooling speed, the solid electrolyte 115 can be non-crystallized, in a case where the molten material 122a is solidified. In addition, the cooling speed is equal to or lower than $10^5$ degree/sec. At this time, a device of cooling the molten material 122a can be easily prepared.

(4) According to the embodiment, the solid electrolyte 122 is heated in a range of 650 degrees to 900 degrees. In a case where the heating temperature is set to be equal to or higher than 650 degrees, the solid electrolyte 122 can be melted. In a case where the heating temperature is equal to or higher than 900 degrees, the composition of the solid electrolyte 122 changes, and thus, the performance of the electrolyte is deteriorated. Accordingly, by setting the heating temperature of the solid electrolyte 122 to be in range described above, the solid electrolyte 122 can be melted without deteriorating the performance of the electrolyte.

(5) According to the embodiment, the range of X of $Li_{2+x}C_{1-x}B_xO_3$ is a real number of 0.2 to 0.6. At this time, even in a case where the boron substitution rate X changes, a high Li conductivity of the solid electrolyte 115 can be stably maintained.

(6) According to the embodiment, the electrode assembly 109 is interposed between the lower electrode 107 and the upper electrode 111 in the battery unit 104. The electrode assembly 109 is the electrode assembly 109 capable of being manufactured with excellent productivity, and thus, the battery unit 104 can be set as a battery including the electrode assembly 109 capable of being manufactured with excellent productivity.

(7) According to the embodiment, the lithium battery 101 includes four battery units 104. The battery unit 104 includes the electrode assembly 109 capable of being manufactured with excellent productivity. Accordingly, the lithium battery 101 of the embodiment can be set as a battery including the electrode assembly 109 capable of being manufactured with excellent productivity.

Fourth Embodiment

Next, one specific embodiment of the electrode assembly of the invention will be described with reference to a schematic sectional side view showing a structure of an electrode assembly of FIG. 36. The embodiment is different from the third embodiment in that the separation layer 110 shown in FIG. 31 is the same material as the solid electrolyte 115 and is connected thereto. The description regarding the same points as those in the third embodiment will be omitted.

Figure 36:
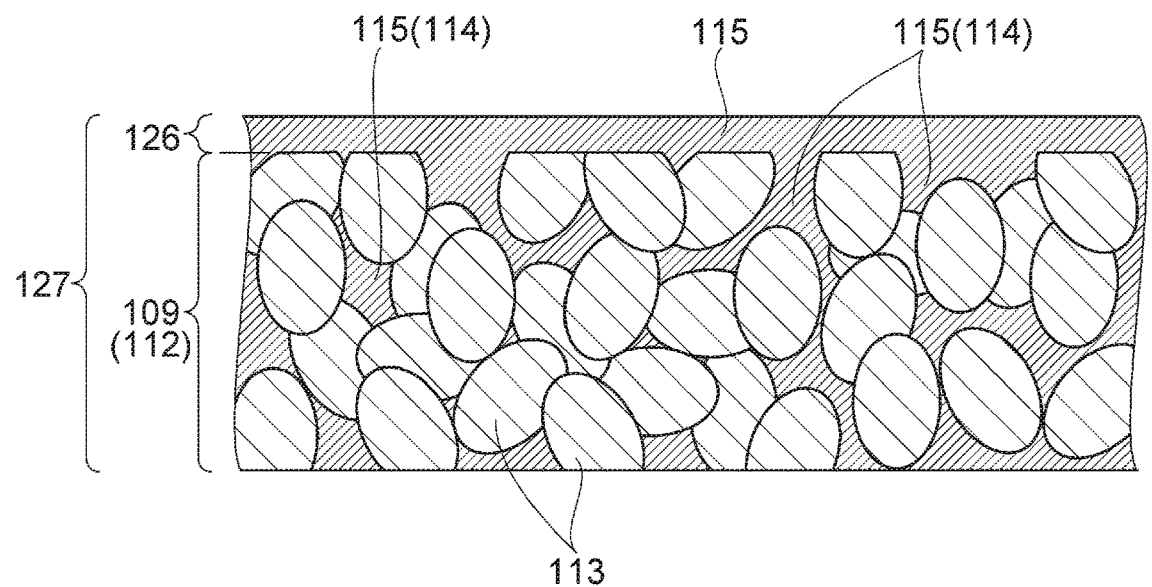
FIG. 36 is a schematic sectional side view of main parts showing a structure of a separation layer-attached electrode assembly according to a modification example.

That is, in the embodiment, as shown in FIG. 36, a separation layer-attached electrode assembly 127 as the electrode assembly includes the electrode assembly 109 and a separation layer 126, and the solid electrolyte 115 of the electrode assembly 109 and the solid electrolyte 115 of the separation layer 126 are connected to each other. The solid electrolyte 115 and the separation layer 126 formed as described above have a connected crystal structure, and the separation layer-attached electrode assembly 127 having a preferable conductivity of lithium ions can be obtained.

In the third embodiment, the communication hole 114 of the active material particles 113 was filled with the solid electrolyte 115 in the step S104 to step S105. Then, the separation layer 110 was provided in the step S107. In the embodiment, in the step S104, the amount of the solid electrolyte 122 provided on the active material formed body 112 is set as the amount with which the separation layer 110 can be formed on the active material formed body 112 after the solidification and crystallization. Accordingly, the separation layer 126 as a layer and a second layer is formed on the active material formed body 112 in the rapid cooling step of the step S106. The separation layer 126 is a film formed of the solid electrolyte 115 which is the same as the solid electrolyte 115 positioned in the communication hole 114. The step S107 is omitted. Since the step S107 is omitted, the separation layer-attached electrode assembly 127 as the electrode assembly provided with the separation layer 126 on the active material formed body 112 can be manufactured with a small number of steps. In the embodiment, the step S101 to the step S106 are also the manufacturing method of the electrode assembly.

A material of the solid electrolyte 115 is filled with the active material formed body 112 of the electrode assembly 109, and then, the solid electrolyte 115 is provided on the electrode assembly 109, thereby continuously providing the electrode assembly 109 and the separation layer 126. Thus, the separation layer-attached electrode assembly 127 can be set as the separation layer-attached electrode assembly having a configuration capable of manufacturing the electrode assembly 109 and the separation layer 126 with excellent productivity.

The embodiment is not limited to the embodiments described above, and various changes and improvements can be added within technical ideas of the invention by a person having ordinary skill in the field.

Modification Example 1

In the embodiments described above, the active material disc 121 was formed from the green sheet 117. The active material disc 121 may be molded by putting and pressing a material into a molding die.

Modification Example 2

In the embodiments described above, the solid electrolyte 122 was heated in the filling step of the step S105. The solid electrolyte 122 may be melted and added dropwise to the active material formed body 112.

Modification Example 3

In the embodiments described above, the component obtained by filling the communication hole 114 of the active material particles 113 with the solid electrolyte 115 was set as the electrode assembly 109. In addition, the aspect provided with the separation layer 110 may be set as the separation layer-attached electrode assembly 125 as the electrode assembly shown in FIG. 31.

Modification Example 4

In the embodiments described above, the separation layer 110 was provided on the electrode assembly 109 in the battery unit 104 of the lithium battery 101. A battery unit in which the separation layer-attached electrode assembly 125 shown in Modification Example 3 is interposed between the upper electrode 111 and the lower electrode 107 may be obtained. In addition, a lithium battery may be obtained by using this battery unit. Further, a lithium battery capable of being manufactured with excellent productivity can be obtained.

The entire disclosure of Japanese Patent Application No. 2015-208664, filed Oct. 23, 2015 and No. 2015-212628, filed Oct. 29, 2015 are expressly incorporated by reference herein.

REFERENCE SIGNS LIST

1: lithium battery as battery
4: battery unit as battery
7: lower electrode as first electrode
9: electrode assembly as first layer
10: separation layer as second layer
11: upper electrode as second electrode
12: active material aggregate
13: active material particles
14: communication hole

15: solid electrolyte
22: solid electrolyte as solid material
25, 27: separation layer-attached electrode assembly as electrode assembly
28: separation layer as layer and second layer

The invention claimed is:

1. A manufacturing method of an electrode assembly, the method comprising:
   a first step of forming an active material formed body including a communication hole;
   a second step of providing a solid material including $Li_{2+x}C_{1-x}B_xO_3$ (X represents a real number exceeding 0 and equal to or smaller than 1) on the active material formed body without using a solvent;
   a third step of melting the solid material; and
   a fourth step of rapidly cooling and solidifying a molten material of the solid material,
   wherein the communication hole is filled with the molten material in the third step, and
   a cooling speed for rapidly cooling the molten material of the solid material is $10^2$ degree/sec to $10^5$ degree/sec in the fourth step.

2. The manufacturing method of an electrode assembly according to claim 1, wherein the solid material is heated at a temperature of 650° C. to 900° C. in the third step.

3. The manufacturing method of an electrode assembly according to claim 1, wherein X in the $Li_{2+x}C_{1-x}B_xO_3$ is 0.2 to 0.6.

4. The manufacturing method of an electrode assembly according to claim 1, wherein the amount of the solid material is an amount with which a layer can be formed on the active material formed body after the solidification.

* * * * *